United States Patent Office 3,518,368
Patented June 30, 1970

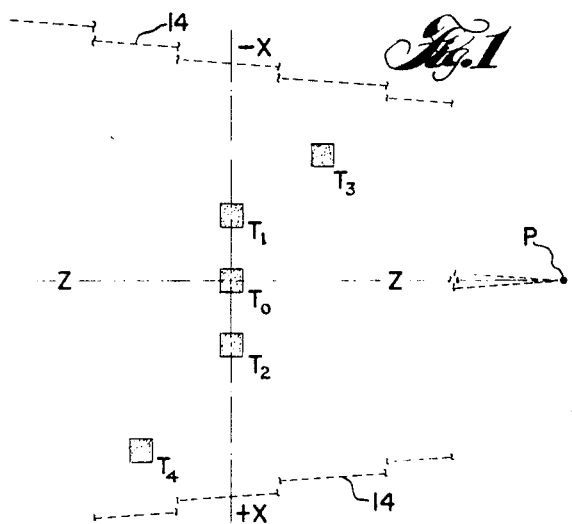
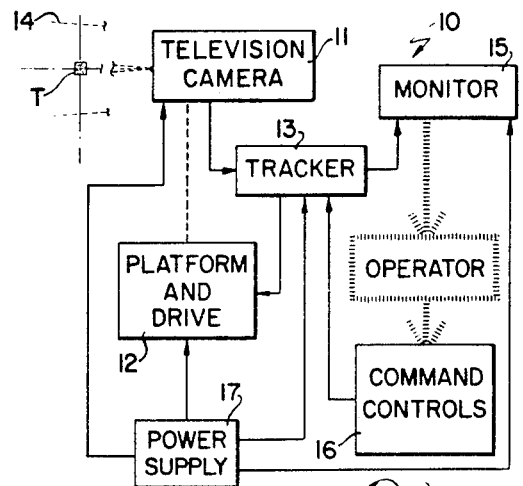
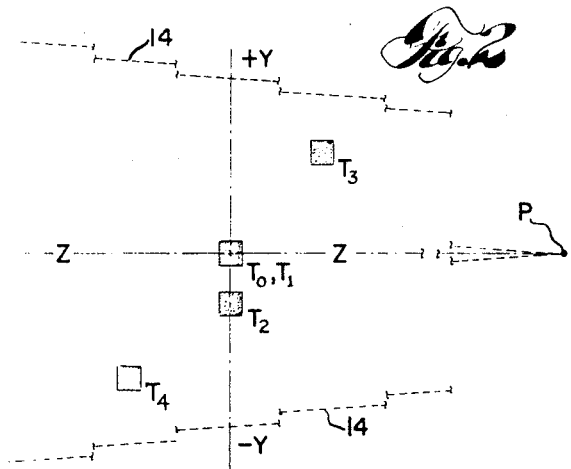
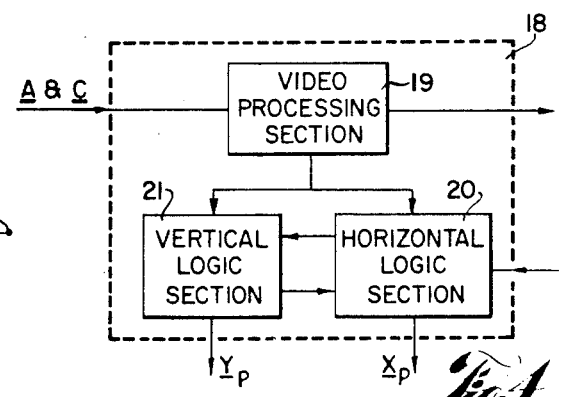
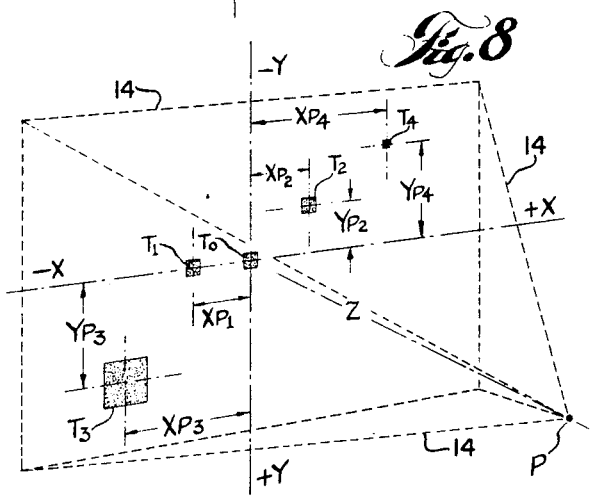
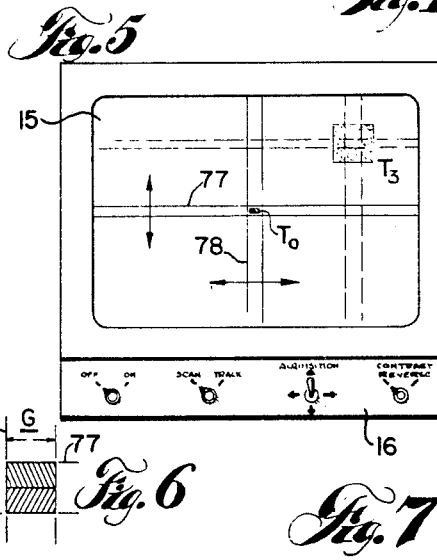
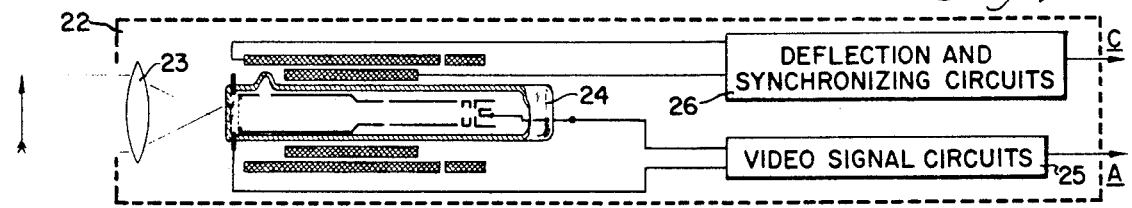

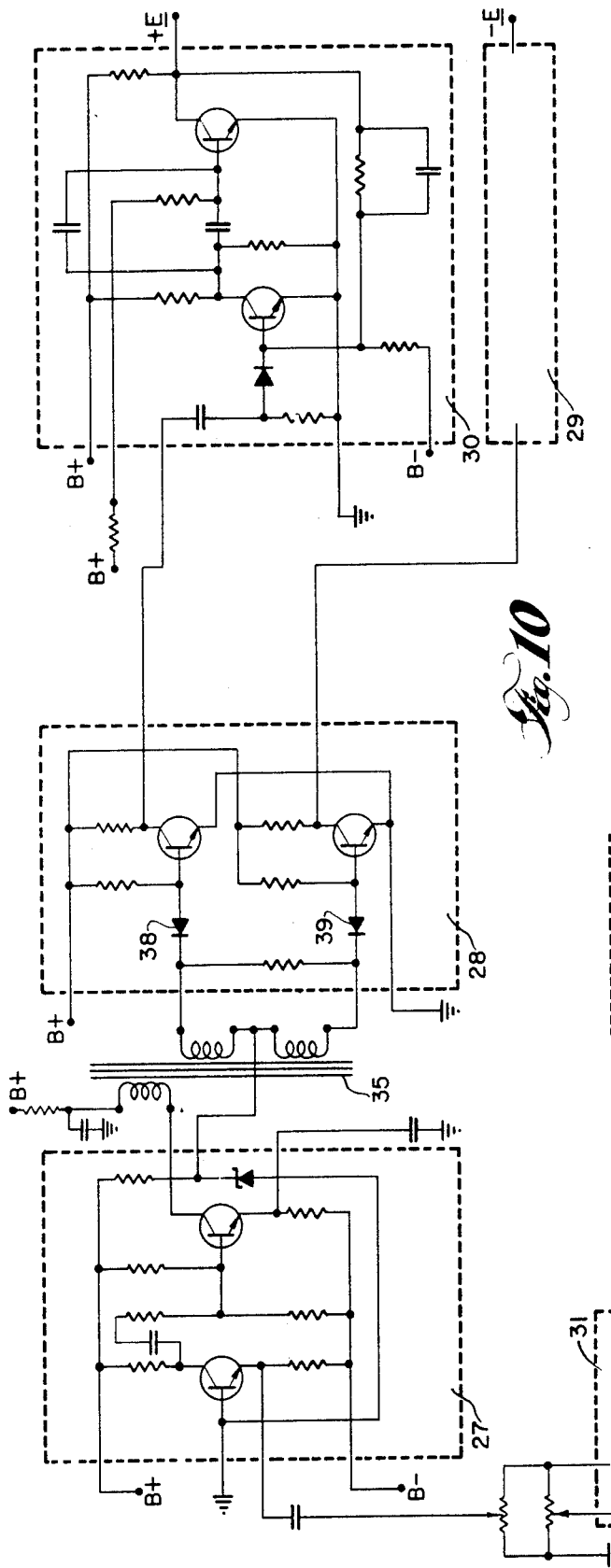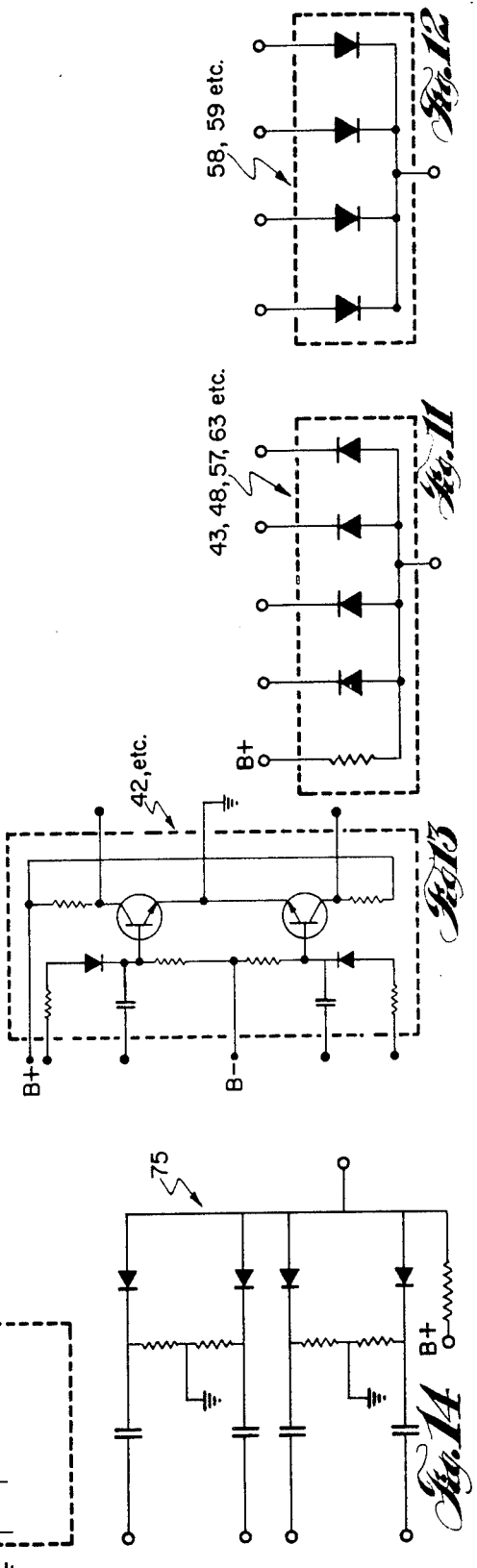

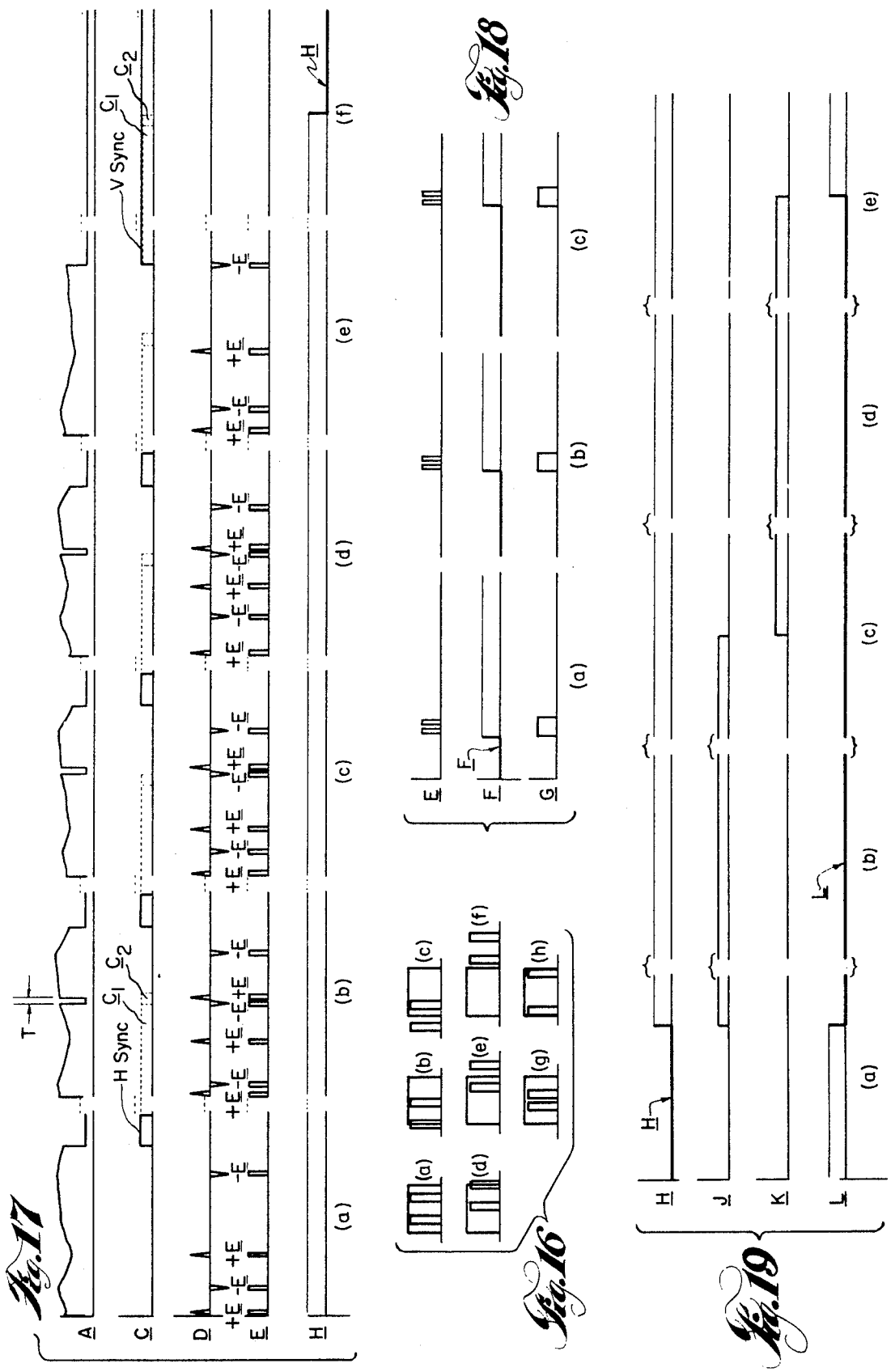

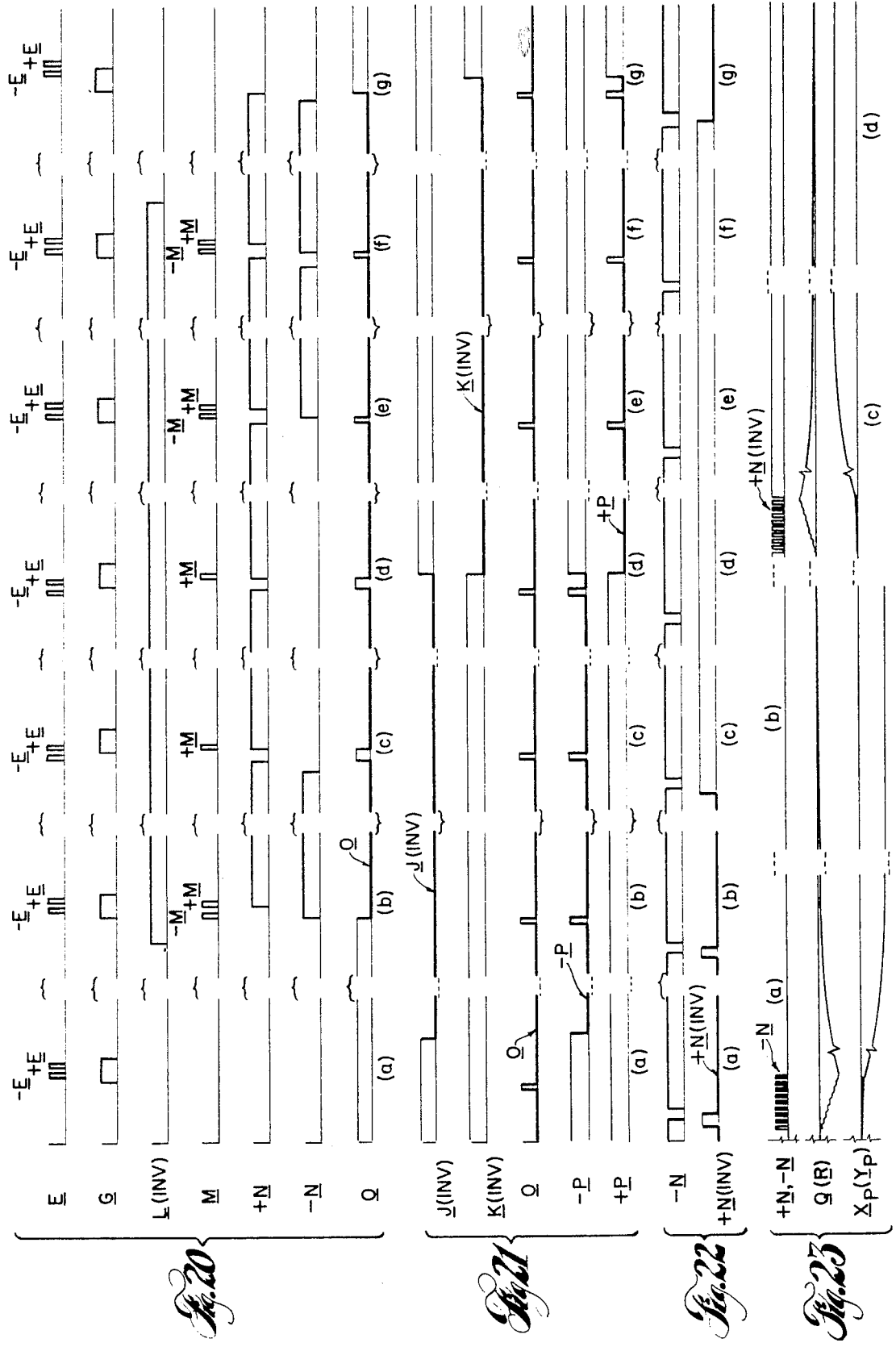

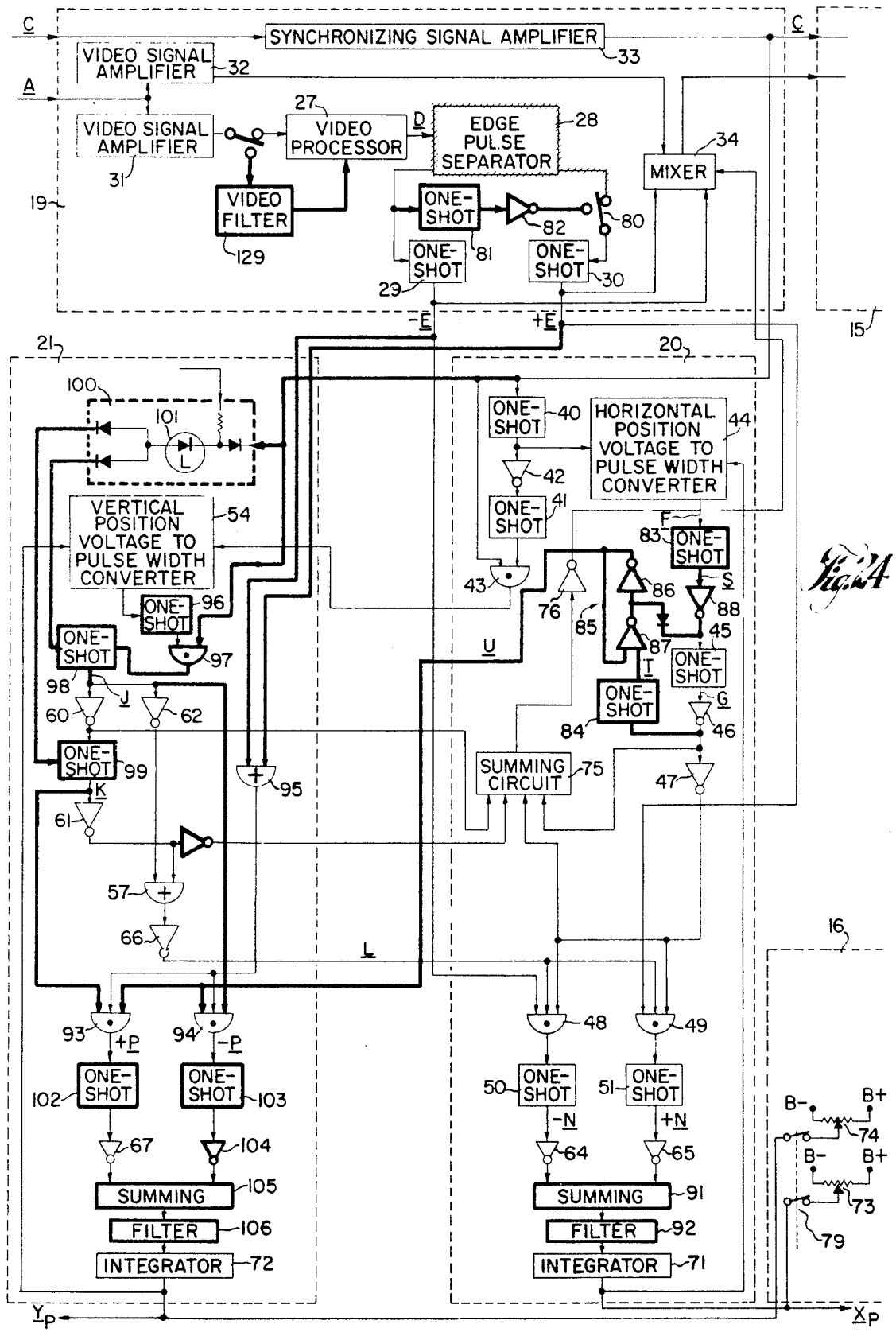

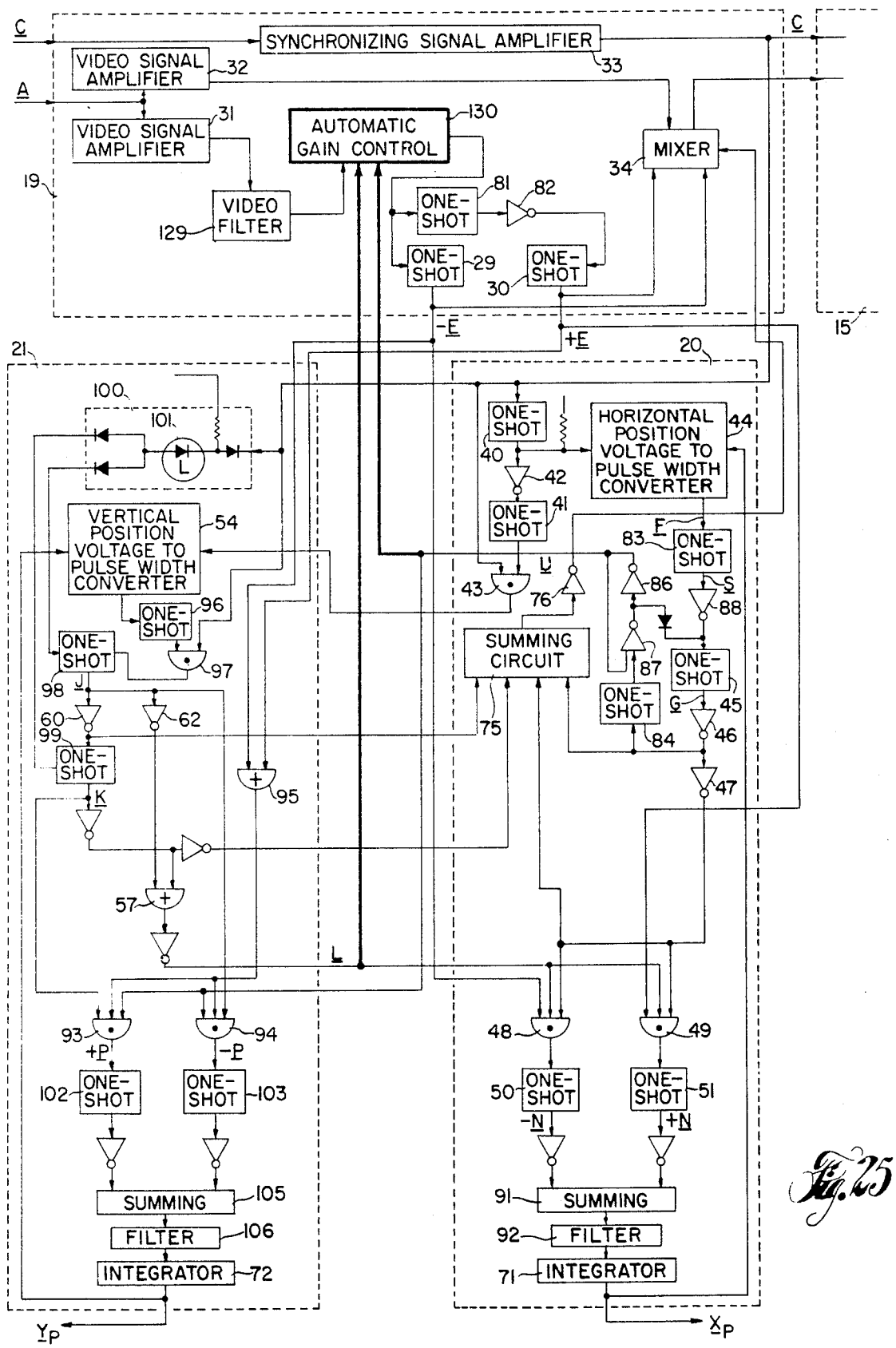

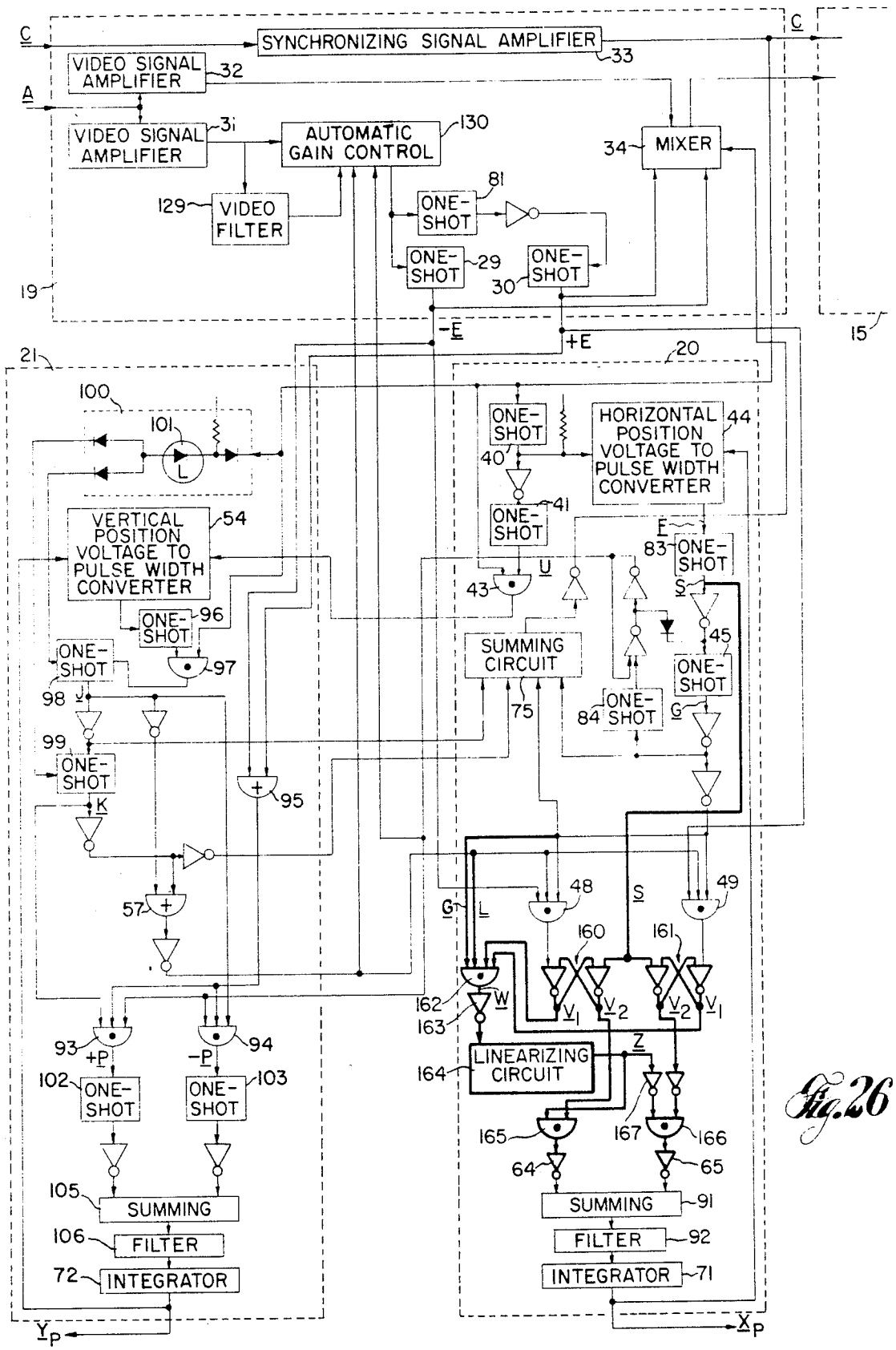

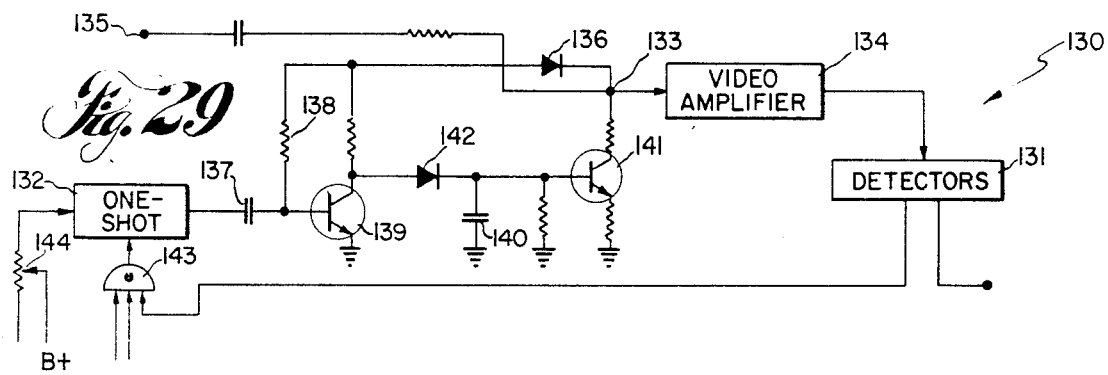
Fig. 29
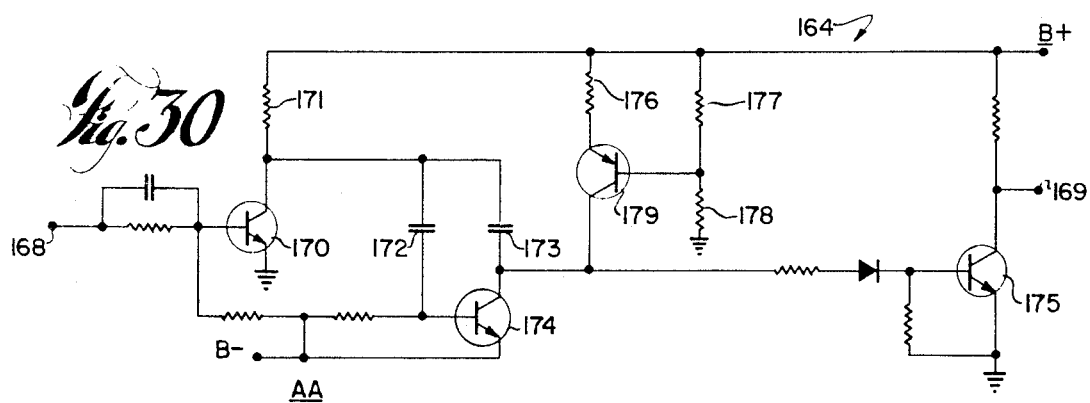
Fig. 30
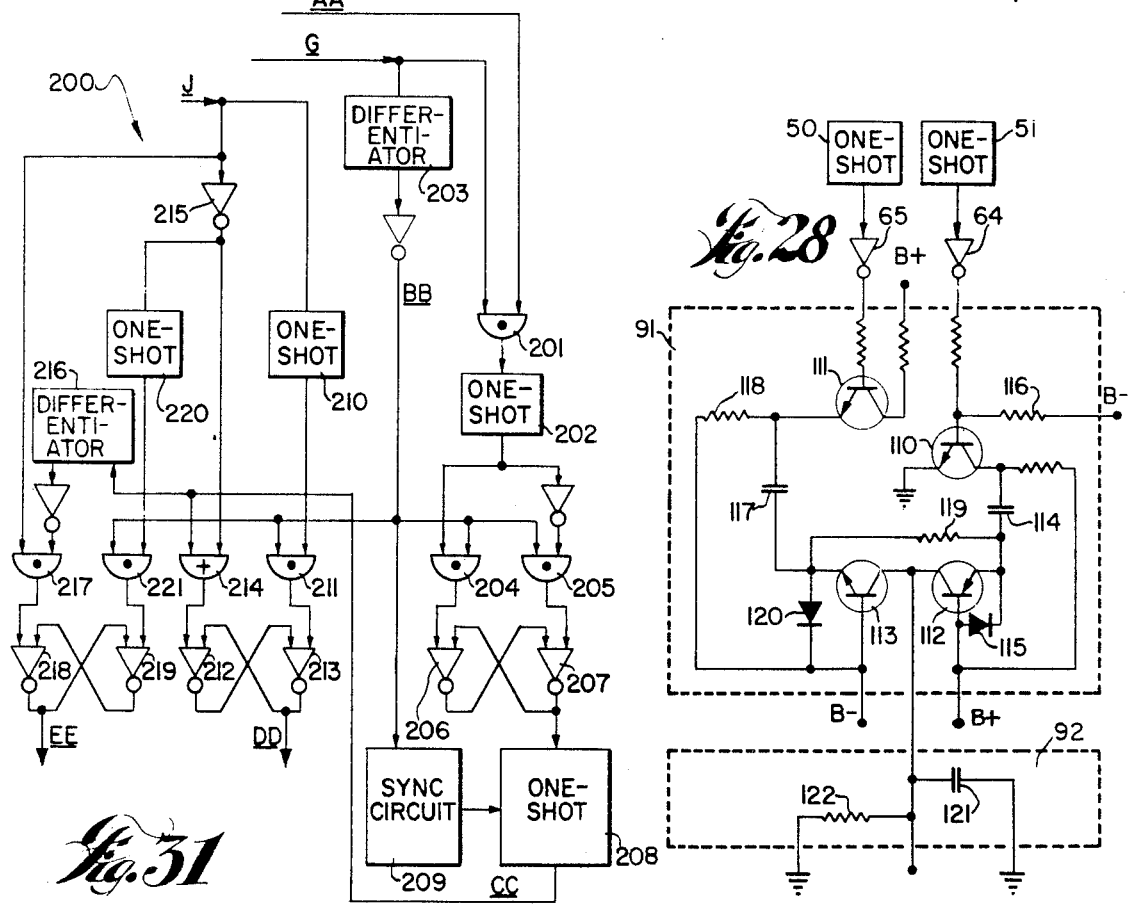
Fig. 31
Fig. 28

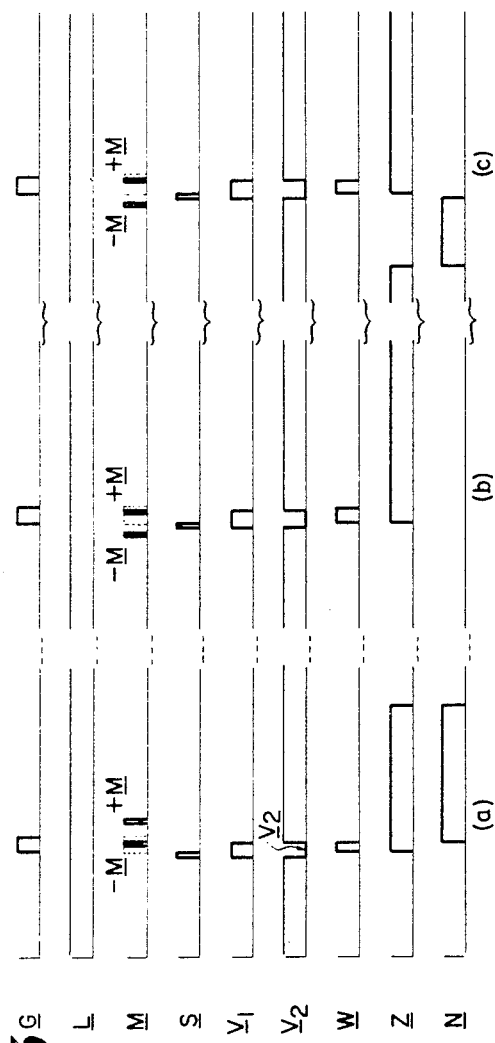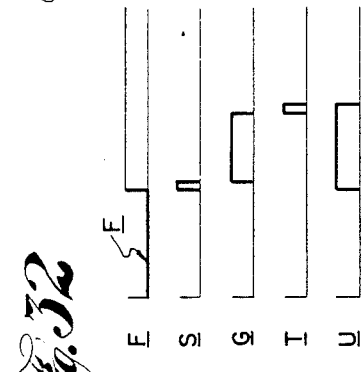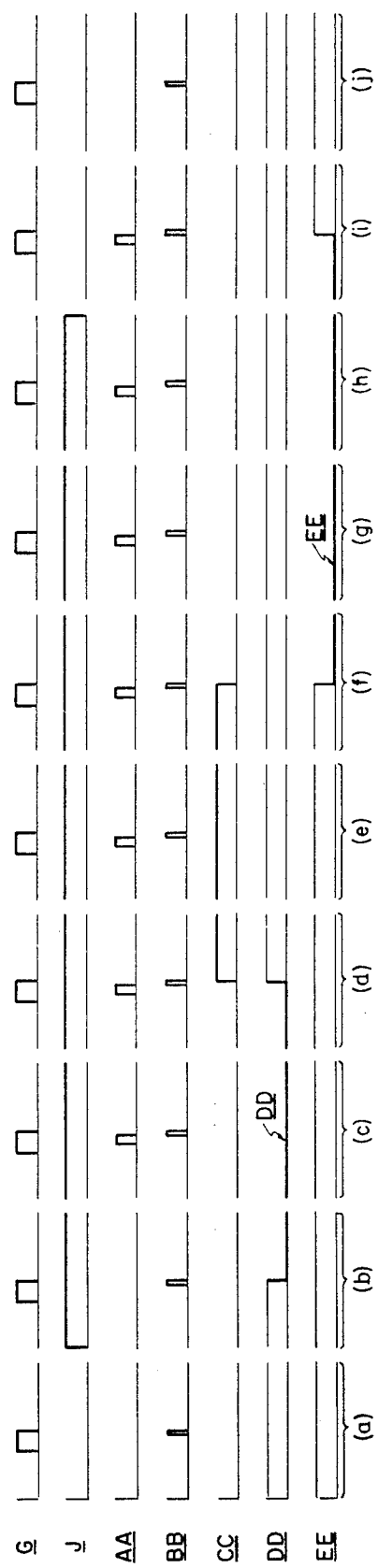

3,518,368
APPARATUS AND INFORMATION PROCESSING METHODS FOR A TRACKING SYSTEM TRACKER UNIT
Everette C. Olson, Columbus, Ohio, assignor to North American Rockwell Corporation, a corporation of Delaware
Filed Oct. 12, 1964, Ser. No. 403,398
Int. Cl. H04n 3/00
U.S. Cl. 178—6.8                    18 Claims This invention relates generally to object tracking, and particularly concerns apparatus and information processing methods for a tracker unit that may be advantageously utilized in a tracking system to establish and maintain the viewing axis of an optical-type sensor in the tracking system in a prescribed directional relation with respect to a selected target.

An important object of this invention is to provide a tracking system tracker unit with apparatus and information processing methods that have utility in an incorporating tracking system to significantly increase the maximum tracking rate obtainable in an automatic mode of system operation, such maximum tracking rates also being more independent of the size, illumination, and contrast characteristics of the selected target than the corresponding rates obtained with known tracker units.

Another object of this invention is to provide a tracking system tracker unit with apparatus and information processing methods that have utility in an incorporating tracking system to significantly increase the probability of maintaining the controlled system sensor with its viewing axis in tracking alignment with the selected target during an automatic mode of system operation, such improved probability essentially being sourced in tracker unit control derived through use of a tracking error signal basic gate pulse that is in effect positioned by repelling action away from any coincident detected target edge and inwardly of the target toward the opposite target edge.

According to the invention, a tracker unit that is to be incorporated in a tracking system to complete a drive control between a television camera sensor unit and its driven supporting platform is provided with a video processing section that receives the television camera video signal and develops marker pulses indicating the scanning time-positions of all contrast changes within each line of camera scan, including contrast changes which identify the leading and trailing edges of a selected target, a horizontal logic section that receives all such video processing section marker pulses and develops horizontal tracking error signals based on the time-coincidence of a variably-positioned basic horizontal tracking gate pulse and contrast change marker pulses associated with detected target leading or trailing edges, and vertical logic section that develops vertical tracking error signals based in part on the time-coincidence of a variably-positioned vertical tracking gate pulse and a signal derived through the aforesaid basic horizontal tracking gate pulse, such horizontal and vertical tracking error signals being developed in the horizontal and vertical logic sections into corresponding tracking correction signals which control operation of the system sensor unit driven supporting platform in tracking relation to the target and in effect drive the system sensor viewing axis to the target interior and which in addition are fed back into their respective logic sections to control positioning of the tracking gate pulses and in effect repel such pulses away from any coincident single target edge and also interiorly of the target toward the opposite (and non-coincident) target edge.

In the drawings:
FIGS. 1 and 2 are plan and elevational views, respectively, of representative sensor-target viewing relations which may exist in connection with the operation of a typical tracking system;

FIG. 3 is a functional block diagram of a tracking system of the type which may advantageously incorporate a tracker unit having the features of this invention;

FIG. 4 is a functional block diagram of the construction that is basic to the type of tracker unit to which this invention applies;

FIG. 5 is an elevational view of one suitable form of the monitor unit and the command controls unit shown as separate functional blocks in FIG. 3;

FIG. 6 illustrates the display relation of the reticle and tracking gates used in the embodiments of a tracker unit detailed by FIG. 9;

FIG. 7 is a combined sectional view and functional block diagram of one form of television camera unit that has been used with the embodiments of a tracker unit shown schematically in FIGS. 9 and 24 through 27;

FIG. 8 illustrates the position of target images projected on the signal electrode of the camera tube illustrated in FIG. 7 in response to various viewing relations shown in FIGS. 1 and 2;

FIG. 10 illustrates particular circuits that are preferred in construction the video processing section shown schematically in FIG. 9;

FIG. 11 illustrates an AND gate circuit module that is preferred in constructing the embodiments of a tracker unit shown schematically in FIGS. 9 and 24 through 27;

FIG. 12 illustrates on OR gate circuit module that is preferred in constructing the embodiment of a tracker unit shown schematically in FIGS. 9 and 24 through 27;

FIG. 13 illustrates an inverter circuit module that is preferred in construction the embodiments of a tracker unit shown schematically in FIGS. 9 and 24 through 27;

FIG. 14 illustrates a summing circuit that is preferred for use in tracker units having the features of this invention to develop an improved monitor unit display;

Figure 9:
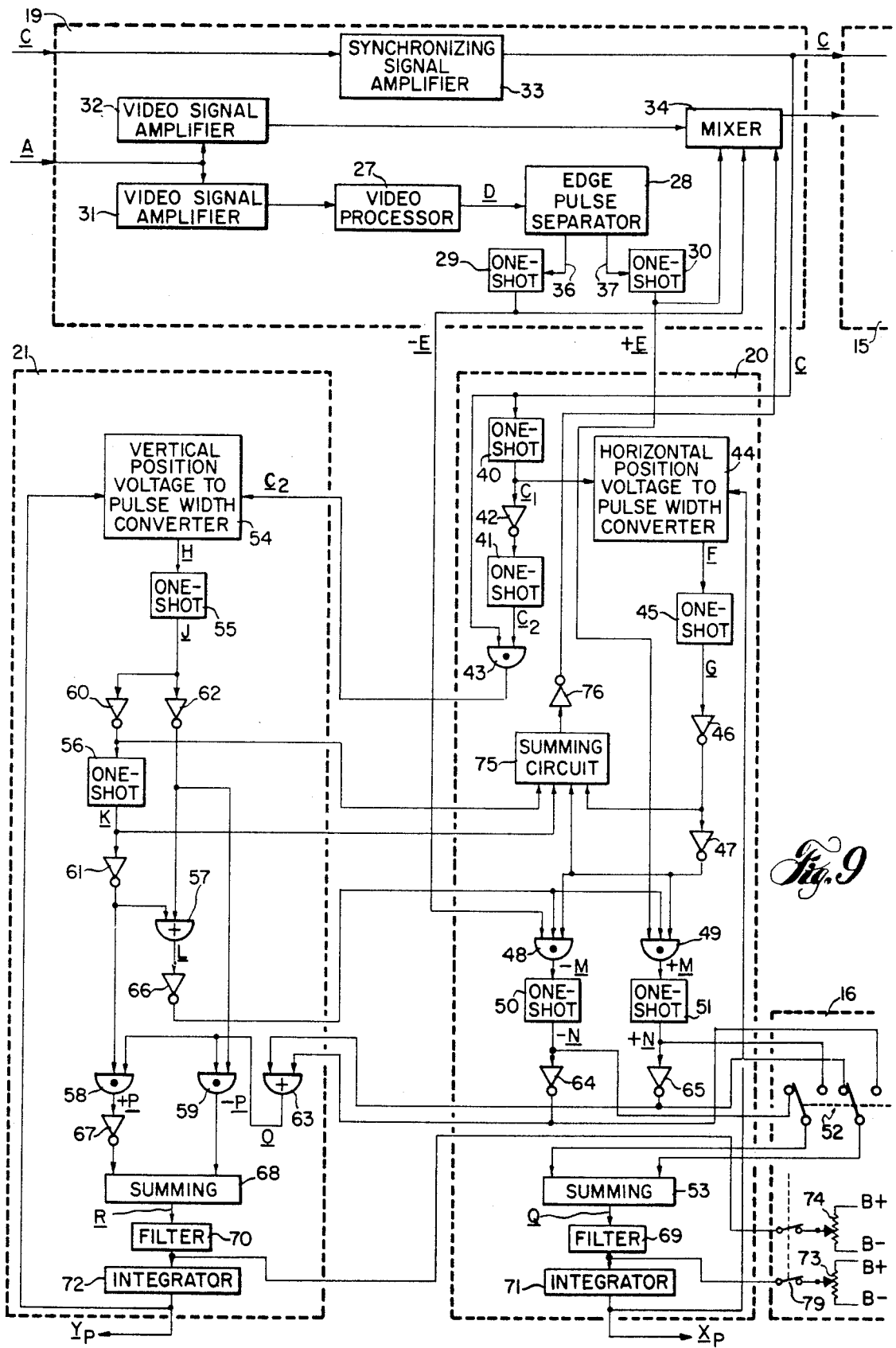
FIG. 9 is a schematic diagram of a basic embodiment of a tracker unit to which this invention has application.
Figure 27:
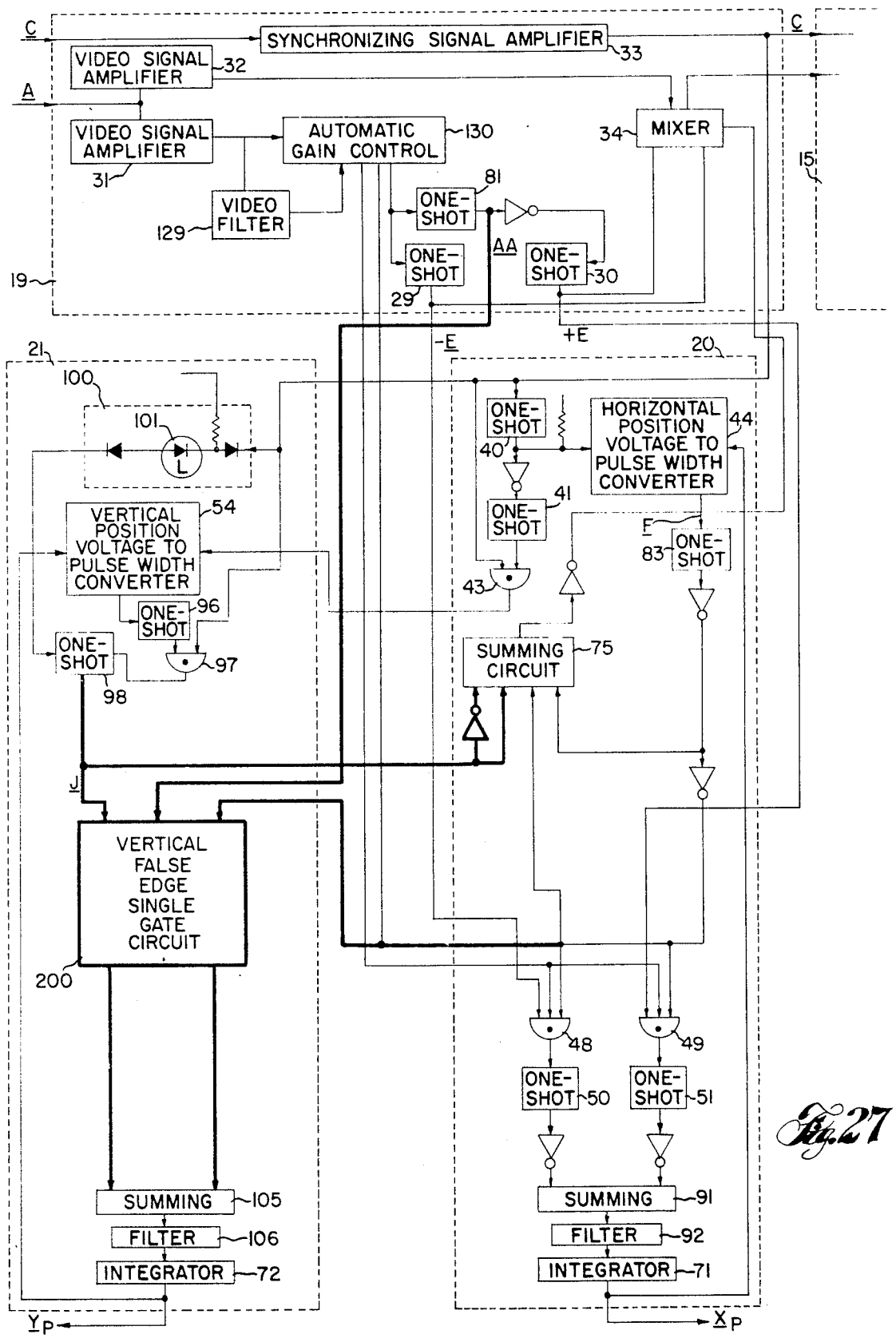

FIG. 16 details various coincidence relations that do or may exist between edge marker pulses of a selected target and the basic horizontal tracking gate pulse utilized in the FIG. 9 tracker unit embodiment;

FIGS. 17 through 23 detail key waveforms that appear at noted points within the tracker unit shown in FIG. 9 during tracking system automatic tracking operation;

FIG. 24 is a schematic diagram of a tracker unit embodiment which differs from the embodiment of FIG. 9 through the use of apparatus and method techniques relating to tracking a selected target in part by means of a false trailing edge;

FIG. 25 is a schematic diagram of a tracker unit embodiment which differs from the embodiment of FIG. 24 through the additional use of apparatus and method techniques relating to automatic gain control;

FIG. 26 is a schematic diagram of a tracker unit embodiment which differs from the embodiment of FIG. 25 through use of apparatus and method techniques relating to the utilization of tracking error signals that are proportioned in duration to the degree such tracking error signals intrude into the basic tracking gate pulse;

FIG. 27 is a schematic diagram of a tracker unit embodiment which differs from the embodiments of FIGS. 25 and 26 through use of apparatus and method techniques which relate to tracking a selected target in part by means of a vertical false edge single tracking gate pulse;

FIG. 28 details an improved summing circuit shown schematically in the tracker unit embodiment of FIG. 24;

FIG. 29 details the automatic gain control circuit shown schematically in the embodiment of a tracker unit shown in FIG. 25;

FIG. 30 details the linearizing circuit shown schematically in the tracker unit embodiment of FIG. 26;

FIG. 31 details the vertical false edge single tracking gate pulse circuit shown schematically in the tracker unit embodiment of FIG. 27;

FIG. 32 details various pulse waveforms that occur in connection with operation of the tracker unit embodiments illustrated in FIGS. 24, 25, and 26;

FIG. 33 details various pulse waveforms that occur in connection with and are peculiar to operation of the tracker unit embodiment illustrated in FIG. 26; and FIG. 34 details various pulse waveforms that occur in connection with and are peculiar to operation of the tracker unit embodiment illustrated in FIG. 27.

The type of tracking system which this invention is broadly concerned with is illustrated generally by the functional block diagram of FIG. 3. Such tracking system is referenced as 10 and is basically comprised of an optical sensor in the form of television camera unit 11, a platform and drive unit 12, and a tracker unit 13. The platform portion of unit 12 serves to support television camera 11; during operation of system 10 in its automatic tracking mode the drive portion of unit 12 serves to move the platform and connected camera unit 11 in tracking relation to the relatively movable target T positioned within the field of view designated 14. Tracker unit 13 regulates tracking movement of platform and drive unit 12 and couples that unit to television camera 11 in a feedback control relation. In addition, system 10 includes a monitor unit 15 which takes the form of a typical monochrome television picture tube and which is used to present a visual display of the general tracking problem viewed by the optical sensor and an indication of system tracking alignment. A human operator provides the link which exists between monitor unit 15 and the command controls function designated 16. The operator is normally responsible for accomplishing such command functions as activating the system, selecting the system mode of operation (scanning or automatic tracking), selecting the target if choice is involved, and obtaining acquisition of the selected target in the system tracking reticle prior to locking-on for automatic system tracking. A power supply 17 of conventional form is typically included in system 10 to provide the preferred electrical energy for system operation.

FIG. 7 is included in the drawings to provide a schematic illustration of a type of television camera unit that has been utilized in a tracking system 10 which incorporated a tracker unit having the features of this invention. Such television camera unit is referenced generally as 22 and is basically comprised of a lens system 23, a camera tube 24, conventional video signal circuits 25, and conventional deflection and synchronizing circuits 26. For the purposes of this invention a specific form of television camera tube is not necessary; however, a vidicon-type camera tube such as is shown as component 24 of FIG. 7 has been utilized as the optical sensor portion of a tracking system having an actual embodiment of this invention. The specific vidicon-type camera tube 24 had a signal electrode photoconductive layer with a ⅜" x ½" format. The video signal circuits 25 and the deflection and synchronizing circuits 26 associated with the actually-used unit 22 operated to produce a standard one-volt television camera output video signal A and a composite horizontal and vertical synchronization signal C with a field repetition rate of 60 cycles per second. Since closed-loop circuits are normally used, it is not required that signals A and C be combined for transmission. Such signals, as used, did produce a standard raster comprised of 525 lines; interlacing of separate field frames can be used but is entirely optional insofar as the hereinafter-claimed invention is concerned. In addition, the video signal A of the actually-used FIG. 7 arrangement included blanking pulses in correlated relation to the signal C horizontal and vertical synchronization information. Equalization pulses associated with the conventional horizontal and vertical synchronization signal produced by circuits 26 are not necessary to operation of the tracking system; also it is generally preferred that the vertical synchronization pulses contained within signal C be non-serrated.

FIG. 4 illustrates the functional block construction of a tracker unit which is designated 18 and which may have any one of the several specific embodiments detailed in the drawings and in the following description; such construction may be advantageously utilized as the tracker unit for tracking systems of the type disclosed generally by FIG. 3. Tracker unit 18 is essentially comprised of a video processing section 19, a horizontal logic section 20, and a vertical logic section 21. Basically, tracker unit 18 receives the output signals of television camera unit 11 (e.g., signals A and C of the FIG. 7 means) and by preferred apparatus (circuit means) and information processing methods derives two output signals that may conveniently be used to control azimuth and elevational movement of unit 12 during the automatic tracking mode of system operation. One such output signal ($X_p$) is basically produced by horizontal logic section 20 and is an error correction signal for automatic tracking in an azimuth sense; the other output signal ($Y_p$) is basically produced by vertical logic section 21 and is an error correction signal for automatic tracking in an elevation sense. Particular schematic arrangements and detail circuits which may be used to comprise the hereinafter-described embodiments of tracker unit 18 are provided in connection with FIG. 9 and subsequent of the drawings.

Several general comments are desirable with respect to the tracker unit details in the drawings. First, some of the included circuits (e.g., video signal amplifiers 31, 32, synchronizing signal amplifier 33, mixer 34, and the like) are or can be conventional in both function and construction and are sufficiently well-known so that a functional block description is adequate for disclosure purposes; details regarding their construction are generally not shown further in the drawings. However, those circuits which are fundamental to operation of any one embodiment of a tracker unit as described herein or which generally are not clearly understood by a functional description alone, are detailed in a suitable specific form elsewhere in the drawings; see FIGS. 10 through 15 for example. Since the detailed circuits are normally completely comprehended by persons reasonably skilled in the electrical-electronic circuits art from an analysis of their schematic arrangements of components and their function, particular component electrical property values are not given. In considering the following description it should also be kept in mind that each disclosed embodiment of a tracker unit in the drawings is basically of a digital-type system that processes information in pulse form; the video signal inputs to, and the tracking error correction signal outputs from, the tracker units, however, are essentially analog in form. Generally, and unless otherwise noted, it is preferred for uniformity purposes that the various disclosed pulse circuits be triggered and fired by detected positive changes in the voltage shape of a received pulse. Accordingly, it is necessary to employ various inverter circuits (e.g., the circuit of FIG. 13) in the disclosed tracker units to key triggering actions to the leading edge of negative pulses or the trailing edge of positive pulses. Details of a satisfactory dual inverter circuit module are provided in FIG. 15. Frequent reference is made in the drawings to a circuit identified as a "one-shot" (e.g., circuit 29, 45, etc.). Such circuit is better described technically as a monostable multivibrator circuit and is detailed in its typical form in FIG. 10. In those instances where the monostable multivibrator circuit employed requires a particular operating duration characteristic, such is indicated in the description. Generally speaking, the basic coupling of individual circuits to a power supply (B+ or B—) or to a necessary ground or reference value voltage is well-understood and is not always shown; similarly usable signal levels are not specified herein. The tracker unit embodiments of the drawings are described in operating relation to a television camera video signal wherein increasing signal voltages are caused by increasing image brightness; by polarity reversal techniques the tracker units can be made to operate equally well using or receiving a television video signal based on a negative transmission method.

Also, unless otherwise noted, the following description refers to negative and positive voltage values and such polarities have meaning with respect to a basic viewing reference. Referring to FIGS. 1, 2, and 8, targets positioned at the center of the system tracking reticle (and also at the center of the monitor or video signal raster) require zero tracking correction and produce zero position voltages and zero value correction signals. Targets viewed in or moved to the raster left or top portions establish positive voltage signals of proportionally increasing value to indicate position location or tracking correction. Conversely, targets viewed in or moved to the raster right or bottom portions are tracked using comparatively negative voltage values to indicate position or nature of correction required. Such polarities are particularly important with respect to the output $X_p$ and $Y_p$ signals of the various tracker embodiments.

Referring to the embodiment of tracker unit 18 shown in FIG. 9 specifically, the basic functions performed by video processor section 19 are accomplished by viedo processor circuit 27, edge pulse separator circuit 28, and one-shots 29 and 30. The signals A and C that are received from television camera unit 11 may be amplified, as by the adjunct amplifier circuits 31, 32, and 33. In addition, a mixer circuit 34 may be incorporated in video processing section 19 for use in developing information to be utilized in monitor unit 15 to display an indication of tracking system tracking alignment. The basic output signals of video processing section 19 are contrast marker pulse signals designated +E and —E.

Basically, video processor circuit 27 receives an amplified video signal A and by differentiating operations detects all increases or decreases in signal voltage which occur within each horizontal line of camera field-of-view scan. By use of a suitably selected circuit time constant value, circuit 27 is made to provide positive and negative edge pulses D corresponding respectively to increases and decreases detected in the voltage of video signal A. A suitable transistorized circuit for accomplishing the differentiating function and for driving the pulse transformer 35 which couples circuit 27 to circuit 28 is shown in FIG. 10 using the corresponding numeral 27 reference. The output positive and negative edge pulse D are then conducted to edge pulses separator circuit 27 wherein all such edge pulses are given the same polarity (positive) but are classified and conducted into separate channels 36 and 37 on the basis of their detected plus or minus voltage slope change origin. Those edge pulses which designate increasing voltage slopes are conducted by channel 36 to one-shot circuit 29 where a squaring and stretching function is accomplished. Similarly, those edge pulses which are associated with decreasing video signal voltage changes are conducted by channel 37 to one-shot circuit 30 where a similar squaring and stretching function is achieved. Suitable component arrangements for accomplishing the functions of circuits 28 through 30 are also shown in FIG. 10 by corresponding numerical designations. Circuit 28 is essentially comprised of two transistorized inverter subcircuits with detecting diodes 38 and 39 to act as full-wave detectors. As previously mentioned, one-shot circuit 30 (detailed in one form in FIG. 10) is aptly technically described as a monostable multivibrator circuit that is fired by the leading edge of a received positive-going pulse. The construction of one-shot circuit 29 can essentially be identical to the construction of one-shot circuit 30. In an actual embodiment of the tracker unit of FIG. 9 it was found desirable that the stretched pulse durations obtained by one-shots 29 and 30 should be approximately $\frac{1}{10}$ to $\frac{1}{5}$ of the video signal horizontal scan time duration that indicates the minimum image of the selected target projected on the photoconductive layer format of camera tube 24 during automatic system tracking; the output pulse durations that were actually developed were each 0.3 microsecond. The output pulse signals of one-shots 29 and 30 are designated as —E and +E, respectively in the remaining portion of this description. Such one-shot output signals are hereinafter frequently referred to as marker pulses and are the previously-referenced basic output signal pulses of video processor section 18.

Since the contrast marker pulses —E and +E locate all contrast changes in each line of camera scan, such marker pulses will include pulses that identify the leading and trailing edge time positions of the selected target that is viewed and that is to be tracked. A +E signal basically indicates a light object leading edge in a dark background or a dark object trailing edge in a light background. Conversely, a —E signal is normally related to a leading edge contrast based on change from a light background to a dark object or to a trailing edge contrast based on change from a light object to a dark background. All references to light and dark are comparative only; all references to leading and trailing edges relate to camera line scanning from left to right and to sequential left and right relative positions. In the case of a negative transmission video signal, the relations (except scanning sequence) are reversed. Also, as will be more fully explained, the tracker units of the drawings can be provided with an appropriate reversing switch that enables the incorporating system to automatically track either comparatively light (white) or dark (black) targets. In this description, details of the operation of the various tracker unit embodiments are provided in terms of positive signal tracking of an essentially dark target positioned within a comparatively light background.

It is required that the operation of horizontal and vertical logic sections 20 and 21 be synchronized with the tracking problem information sensed optically by camera unit 11 and transmitted in video signal A. For this reason, tracker unit 18 of FIG. 9 is provided with a synchronization circuit that in one form is essentially comprised of one-shot circuits 40 and 41, intermediate pulse inverter circuit 42, and AND gate circuit 43. Such synchronization circuit is located in section 20 of the FIG. 9 arrangement only as a matter of convenience. One-shot circuit 40 is triggered by the leading edge of each synchronization pulse comprising composite signal C and produces a positive pulse output signal $C_1$ having a time duration that is at least greater than the pulse width of any horizontal synchronization pulse in composite signal C but that is appreciably less than the time duration of one video signal scan-line. In an actual embodiment of the FIG. 9 arrangement, a time duration of approximately one-half scan-line (e.g., 30 microseconds) has been found suitable for output pulse signal $C_1$. Such signal $C_1$ is inverted by circuit 42 so that the decreasing voltage trailing edge of $C_1$ in effect triggers one-shot circuit 41 to thereby cause circuit 41 to create a pulse signal $C_2$ that serves a triggering function and that exists only during the absence of a horizontal synchronization pulse. A comparatively short time duration (e.g., 2 microseconds) for such output pulse signal $C_2$ has proven adequate for at least one known tracker unit application. AND gate circuit 43 receives all pulses of composite synchronization signal C and also all trigger pulse signals $C_2$ from one-shot circuit 41. Such trigger pulse $C_2$ is gated through AND gate 43 only when it is time coincident with a vertical synchronization pulse. See FIG. 17. The trigger pulse gated through AND gate circuit 43 also is referenced as signal $C_2$. It should be noted that signal $C_2$ is synchronized with the vertical synchronizing pulse but has a slight time lag with respect to its leading edge; such delay is not at all detrimental to the operation of vertical logic section 21.

A horizontal tracking gate pulse signal having a controlled time position in each raster scan-line is developed in horizontal logic section 20 essentially by means of controllable monostable multivibrator circuit 44 and one-shot circuit 45. Details of a suitable construction for circuit 44, also referred to as a horizontal position voltage to pulse width converter circuit, are provided in FIG. 15 using a similar reference numeral. That circuit as will be noted, is essentially a time delay circuit that is triggered by a positive-going voltage change in the leading edge of each pulse $C_1$ generated by one-shot circuit 40; such leading edges also correspond to the leading edges of the horizontal synchronization pulses in signal C. The output signal F of circuit 44 is a negative-going pulse whose time duration from start is proportional to the magnitude of feedback analogue voltage signal $X_p$ which is developed by section 20 as a whole. (See FIG. 18 for an illustration of three different pulse F durations.) Negative-going output pulse F has a positive-going trailing edge that triggers or fires one-shot circuit 45. One-shot circuit 45 develops a positive output pulse G which has a short time duration and which is the hereinbefore referred to basic horizontal tracking gate pulse. Such gate pulse should be somewhat longer in duration than the duration of the horizontal scan of the target image in each line of the video signal. Signal G in an actual embodiment of the invention used in tracking a moving vehicle at a distance of over two miles away had a time duration of approximately 2 microseconds and was in the range of $\frac{1}{80}$ to $\frac{1}{20}$ the duration of the non-blanked part of the video signal A scanline. Inverter circuits 46 and 47, which circuits may comprise a dual inverter circuit module such as is shown in FIG. 13, are utilized to condition horizontal tracking gate pulse G for use in other portions of horizontal logic section 20.

The detection of a horizontal tracking alignment error is accomplished essentially by paired but independent AND gates 48 and 49. Details regarding a typical satisfactory construction for the AND gates used in the invention are provided by FIG. 11. AND gates 48 and 49 each utilize three input terminals of the AND gate module detailed in FIG. 11. In each instance, one of the input terminals receives the positive-going horizontal tracking gate pulse signal G originated in one-shot circuit 45 as fully inverted and re-inverted by circuits 46 and 47. Another input terminal of each such AND gate receives a vertical tracking gate pulse signal L developed within vertical logic section 21. AND gate circuit 48, in the arrangement of FIG. 9, also receives all —E edge marker pulse signals produced by one-shot 29 of video processor section 19; similar AND gate 49 is arranged to receive all of the +E edge marker pulse signals developed by one-shot circuit 30 of video processor section 19. AND gate circuits 48 and 49 each function to pass the —E and +E edge marker pulse signals through to trigger or fire one-shot circuits 50 and 51, respectively, whenever signals G and L are time-coincident therewith. When the sensor of the tracking system is properly aligned with the selected target, both a —E and a +E marker are passed through the AND gates at the time of the gate pulse. A separate waveform designation M is assigned to the passed signals resulting from the time-coincidence of horizontal and vertical tracking gates and a contrast marker pulse in AND gates 48 and 49. Such signals, which are basically tracking error detection signals, in turn are preferably extended time-wise by one-shot circuits 50 and 51 to just less than one scan-line period in duration (e.g., 60 microseconds) to form the basic horizontal tracking error pulse signals N developed within tracker unit 18; such signals exist in either a —N or +N category although each would have an identical positive-going polarity form. One-shot circuits 50 and 51 are similar to circuit 30 but must each be provided with a fast-recovery capability (e.g., 0.5 microsecond).

As previously mentioned, the tracker units of the drawings may be provided with means which enable an incorporating tracking system to follow a selected light target on a comparatively dark background as well as dark targets positioned within a light background. This may basically be accomplished through use of the reversing switch 52 shown as a part of command controls function 16. In the switch 52 switching position shown in FIG. 9, the input terminal portions of summing circuit 53 are arranged for developing a positive voltage tracking error correction signal $X_p$ based on the coincidence gating of essentially only +E marker pulse signals associated with the trailing edge of an essentially dark, relatively leftward-moving target positioned in a comparatively light background. Similarly, relativley rightward movement of the target produces a proportional negative voltage error correction signal $-X_p$.

Tracker unit 18 also detects vertical tracking errors and develops related correction signals, such being accomplished essentially within vertical logic section 21. However, the apparatus and information processing methods utilized in section 21 differ somewhat in construction and function from the comparable aspects of horizontal logic section 20. The differences essentially relate to use of a different form of tracking gate; also, position information concerning the detected target is derived from horizontal logic section 20 signals rather than from video processor section 19.

Vertical tracking gate pulse signals having a controlled vertical position within the vertical extent of the complete raster produced by television camera unit 11 are developed in vertical logic section 21 essentially by means of controllable monostable multivibrator circuit 54 and one-shot circiuts 55 and 56. A suitable construction for circuit 54 corresponds to the previously-detailed FIG. 15 construction for circuit 44. Circuit 54 is also referred to as a vertical position voltage to pulse width converter circuit; it is a time delay circuit that is triggered by a positive-going voltage change in the leading edge of each pulse $C_2$ passed through AND gate circuit 43. Such leading edge identifies the existence of a vertical synchronization pulse within composite signal C. The output signal H of circuit 54 is a negative-going pulse whose time duration from start is proportional to the voltage of signal $Y_p$ developed by section 21 as a measure of required vertical tracking error correction for the system. Output pulse H has a positive-going trailing edge that fires one-shot circuit 56 only. One-shot circuit 56 develops a positive output pulse J having a time duration that constitutes one portion of the basic vertical tracking gate of tracker unit 18. Signal J in one actual embodiment of the invention was provided with a time duration of approximately 400 microseconds or 6 video signal scan-line periods; stated in another manner, signal J in time duration was preferably in the range of $\frac{1}{80}$ to $\frac{1}{125}$ of the duration of the video signal A field repetition frequency. The pulse signal J output of one-shot circuit 55 is inverted by inverter circuit means 60 so that its trailing edge in effect triggers one-shot circuit 56. The output signal K of circuit 56 preferably has a form and duration corresponding to the form and duration of signal J produced by one-shot circuit 55. Output pulse signal K then constitutes the remaining portion of the basic vertical tracking gate of tracker unit 18. Signals J and K are in effect combined by OR gate 57 to form the basic vertical tracking gate pulse signal L that is required in horizontal logic section 20 on a coincidence basis to give —E and +E contrast marker pulses through gates 48 and 49. Inverter circutis 61 and 62, like circuit 60, are provided in section 21 to develop the proper polarity for the indicated pulses at the indicated stages of signal processing. In this respect, it should be noted that OR gate 57 functions to gate negative pulses; the output of that gate in turn must be inverted, as by inverter circuit 66, to place the vertical tracking gate pulse in proper polarity condition for gates 48 and 49.

The detection of a vertical tracking alignment error is accomplished in vertical logic section 21 essentially by paired but independent AND gates 58 and 59. As in the case of AND gates 48 and 49, such vertical section gates may use the construction detailed in FIG. 11; however, AND gates 58 and 59 each utilize only two input terminals. In each instance, one of the input terminals receives a horizontal tracking error signal O from OR gate 63; such signal is essentially made up of —N or +N horizontal tracking error signals as inverted by inverter circuits 64 and 65. The other input terminal of AND gate 58 receives the vertical tracking gate signal K developed within one-shot circuit 56 after appropriate inversion by circuit 61. AND gate 59, on the other hand, has its other input terminal arranged to receive the J pulse signal portion of the basic vertical tracking gate after it has been inverted by inverter circuit 62. Whenever an inverted —N or +N horizontal tracking error signal is received at AND gates 58 and 59 in time-coincident relation to either of vertical tracking gate pulse signals J or K, such stretched horizontal tracking error signals serve to form corresponding vertical tracking error signals that passed through (and in the case of —P signals after inversion by circuit 67) to summing circuit 68. A separate waveform designation P is assigned to the passed signals resulting from the time-coincidence of a vertical tracking gate and a horizontal tracking error detection signal. Those tracking error detection signals which are associated with the gating action of one-shot circuit 55 only are given a —P designation; those vertical tracking error detection signals which are developed through time-coincidence with the vertical tracking gate pulse established by one-shot circuit 56 are designated as +P. Time-wise in each raster, +P pulses will normally occur, if there is no vertical tracking error, after the developed —P pulses.

The remaining portions of logic section 20 (and 21) are each comprised of a summing circuit 53 (or 68), a filter circuit 69 (or 70), and an integrator circuit 71 (or 72), as shown in FIG. 9. Such additional circuits essentially function to develop appropriate tracking error correction signals ($X_p$ or $Y_p$) for controlling movement of the tracking system sensor in tracking relation to moving or movable target T. Such tracking error signals, which are basically in DC voltage analog form, also are provided as feedback signal inputs to controllable monostable multivibrator circuits 44 and 54. Detailed construction of particular circuits for carrying out the functions of circuits 53 and 69 through 72 are provided in FIG. 15. Since the constructions of circuits 68, 70, and 72 preferably correspond to the constructions of circiuts 63, 69, and 71, respectively, duplicate details are not provided in the drawings.

Figure 15:
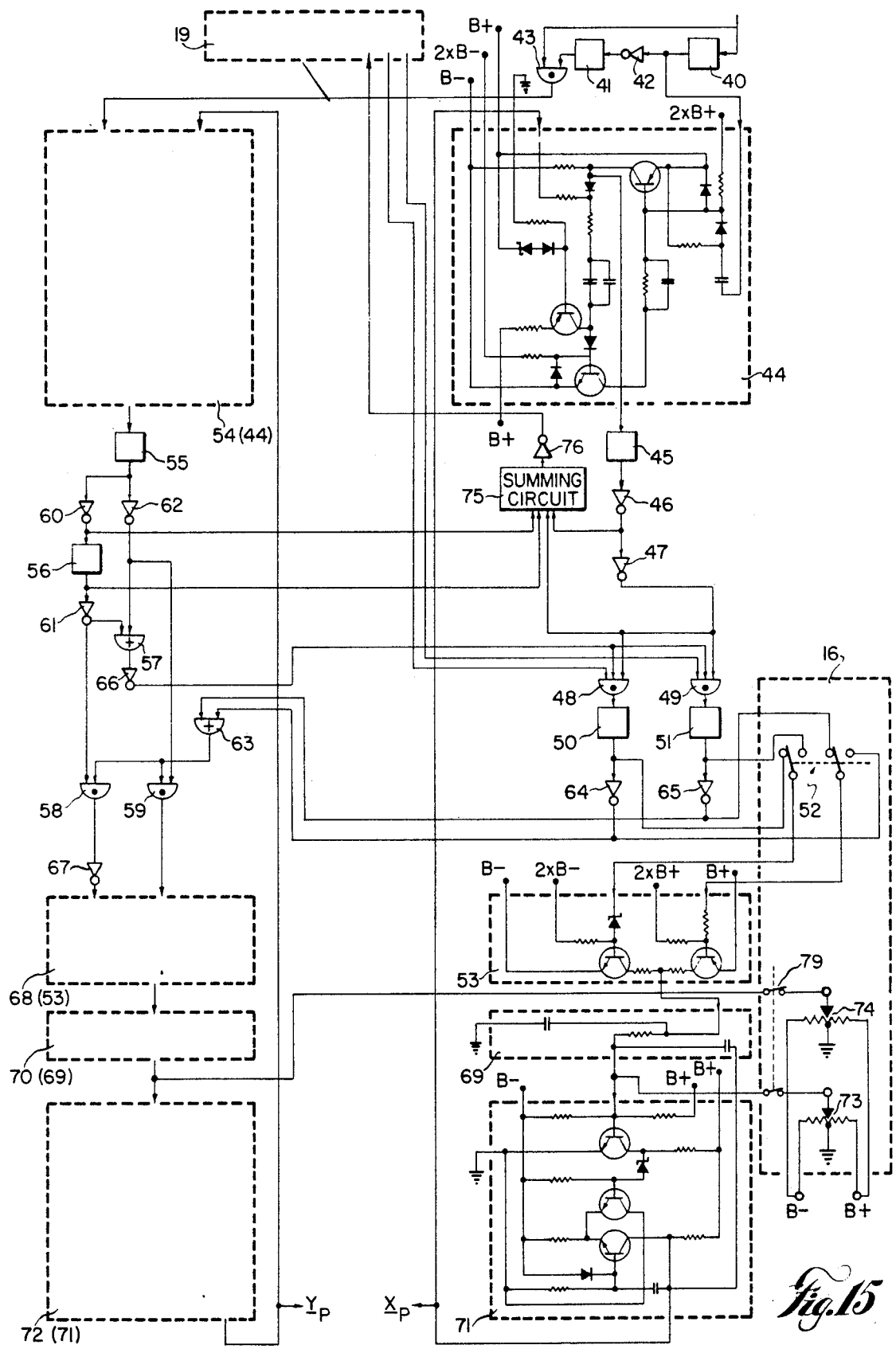
FIG. 15 illustrates particular circuits that are preferred in constructing the horizontal and vertical logic sections shown schematically in FIG. 9.

Summing circuit 53 of FIG. 15 functions to add the —N and inverted +N tracking error pulses which appear at any instant within horizontal logic section 20 during operation of the tracker unit. The output signal of summing circuit 53 is designated Q; in the case of circuit 68, the output signal is identified by the reference letter R. Normally, the —N and the +N signals which are introduced into summing circuit 53 are largely coincident during each scan-line period of tracking alignment and during tracking the difference seen by circuits 69 and 71 is essentially zero. However, when there is tracking misalignment a sequence of —N or +N pulses are present and do cause error correction signals to be developed in the subsequent portion of the tracker unit. (See FIG. 23 for specific examples.) In the case of summing circuit 68, however, the input tracking error signals —P and inverted +P are entirely non-coincident. This is because vertical tracking gate pulses J and K are derived sequentially.

Filter circuits 69 and 70, details for which are given in FIG. 15, are provided in the invention so as to essentially average out or smooth the pulsed output signals Q and R so as to be in usable form for integrator circuits 71 and 72. Circuits 69 and 70 are substantially identical in function but differ in that filter circuit 70 must essentially respond to R signals which normally occur in sequential groupings. Up to six successive individual pulses may comprise each such groupings in the case of specific one-shot circuits 55 and 56 each having a 400 microsecond output. Integrator circuits 71 and 72 respond essentially to the output of circuits 53 and 68; their outputs are inverted relative to the polarity of the inputs to the summing circuits 53 and 68. See FIGS. 22 and 23.

FIG. 15 (and also FIG. 9) provides schematic details of certain manually-operated controls that may be desirably incorporated in command control function 16 to facilitate operation of tracker unit 18. Such specific command controls include reversing switch 52, acquisition potentiometer means 73 and 74, and selection switch 79. A basic on-off switch is generally desirable but is not shown in the drawings. As previously explained, reversing switch 52 is provided so as to improve the capability of tracker unit 18 to follow essentially light targets existing on a comparatively dark background as well as the indicated dark target positioned on a light background. Potentiometer means 73 and 74 may be operated relative to an intermediate zero potential or ground voltage value to either of the indicated maximum B— and B+ supply voltages. In the specific embodiment of the invention shown in FIGS. 1 through 15, a zero output voltage associated with signal $X_p$ positions the horizontal tracking gate pulse at the horizontal center of the television camera video signal scan-line. B+ ($+X_p$) values position the gate toward the left extreme (FIG. 5) of the resulting raster; basically, the degree of displacement from the center is directly proportional to the magnitude of the developed positioning voltage value. Similarly, potentiometer means 73 may be manually positioned to B— ($-X_p$) voltage values to displace the horizontal tracking gate pulse proportionately to the right (FIG. 5) of the raster horizontal center position. In a similar manner, potentiometer means 74 may be moved manually to obtain B— and B+ voltage values to displace the vertical tracking gate pulses J and K in their natural time sequence below or above, respectively, the vertical center of the video signal output raster. Scan-track switch 79 must be closed as shown in the drawings to facilitate initial target acquisition for automatic tracking; once acquisition of the target is obtained, switch 79 may be opened to make potentiometer means 73 and 74 inoperative and to place movement of the tracking system optical sensor and tracking gate pulses under the complete locked-on control of tracking error correction signals $X_p$ and $Y_p$ produced by logic sections 20 and 21.

The television picture tube element normally included in monitor unit 15 basically receives video signal A and synchronization signal C for developing a conventional visual presentation of the general tracking problem to be observed by the system operator. The visual display presented thereby, however, may be significantly enhanced ner features of this invention. Such enhancement is accomplished by means of summing circuit 75 and by ...s of the —E and +E edge marker pulse signals developed in circuits 29 and 30. Summing circuit 75, details of which are provided in FIG. 14, develops so-called ...ss-hair pulse information for presentation on the screen of monitor unit 15. Such cross-hair pulse information develops the paired horizontal cross-hair lines 77 and the paired vertical cross-hair lines 78 shown in FIG. 5. The rectangular area defined by and located within the intersection of cross-hair lines 77 and 78 comprise the tracker unit 18 reticle. For tracking with the FIG. 9 unit, the selected target is located entirely within the reticle for target acquisition or lock-on purposes. See FIG. 5 and the target display reference $T_0$. FIG. 6 shows the makeup of that reticle in terms of the duration of tracking gate pulses G, J, and K. The cross-hair pulse information is developed in circuit 75 essentially by differentiator subcircuits that detect negative-going voltage changes in the leading and trailing edges of the appropriate gate pulses. More specifically, one input terminal of circuit 75 receives signal G after a single inversion and detects its leading edge; another input terminal of circuit 75 receives pulse G after a double inversion by circuits 46 and 47 and detects its negative-going trailing edge. Such detected edges comprise, after inversion and mixing, the cross-hair pulses that form dark cross-hair lines 78. In a similar manner, signals J (after inversion by circuit 60) and K are conducted to summing circuit 75 where their leading and trailing edges, respectively, are detected. The differentiated detected leading and trailing edges of the vertical gate pulses are afterwards introduced into monitor unit 15 to comprise horizontal cross-hairs 77.

This display developed for monitor unit 15 may also be enhanced by appropriate use of edge marker pulses —E and +E as follows. Mixer circuit 34 can function to gate those edge (contrast change) marker pulses which are time-coincident with tracking gate edge pulses developed in summing circuit 75 and amplify such passed pulses for presentation in the picture tube of monitor unit 15. The so-gated and so-amplified marker pulses give a display indication to the operator that tracker unit 18 is actually following the selected and displayed target contained within video signal A.

FIG. 16 is provided in the drawings to illustrate various coincidence relations that do (or may) exist as between edge marker pulses associated with a selected target and the basic horizontal tracking gate pulse. Preferably, the —E and +E edge marker pulses associated with the leading and trailing edges of a selected target are positioned entirely within the horizontal tracking gate pulse as shown in FIG. 16(a). If the target is moved to the left relative to the viewing axis of the system optical sensor as in the case of a movement toward position $T_2$ from aligned position $T_0$ of FIGS. 1 through 3, the —E leading edge pulse will become coincident with the leading edge of the horizontal tracking gate pulse (FIG. 16(b)). Inasmuch as coincidence is maintained as between the tracking gate pulse and at least a part of each target edge marker pulse, such being a non-singularly coincident pulse relation, no tracking alignment error is detected. Complete absence of but one of the two target edge marker pulses from within the tracking gate (FIG. 16(c)), i.e., a singularly coincident pulse relation, causes development of a tracking error signal based on the coincidence of the remaining interiorly-positioned target trailing edge marker pulse. Such error correction signal, as processed through summing circuit 53, filter circuit 69, and integrator circuit 71, in effect causes the horizontal gate to be repelled away from the coincident singular target edge marker pulse and toward the "escaped" target opposite edge (target interior) marker pulse, i.e., toward a non-singularly coincident pulse relation. Relative movement between the target and the horizontal tracking gate in an opposite direction will cause tracking gate conditions corresponding to the relations shown in FIGS. 16(d) and 16(e). Sufficient rightward movement of the target will ultimately result in only the target leading edge being coincident with the horizontal tracking gate pulse so as to cause an error signal indicating a need for tracking correction. See FIG. 16(e). FIG. 16(f) illustrates the situation which occurs when the selected target in effect outruns the established horizontal tracking gate. This situation is commonly referred to as an "unlock" situation; it occurs whenever the relative movement between the selected target and the optical sensor occurs at a rate that exceeds the maximum obtainable tracker unit tracking rate. FIG. 16(g) illustrates the minimum target edge marker pulse separation which generally may be permitted with respect to successful actual embodiments of the tracker units described herein. The improved tracking rates which are obtained with the disclosed embodiments result chiefly from those wherein the distance between the target edges (edge marker pulses leading edges) is not less than 1/10 the duration of the horizontal tracking gate. The net effect of closing movement of the target relative to the tracker, or vice versa, is illustrated by FIG. 16(h). As shown therein, the spacing between the target edge marker may increase relative to its projection on the television camera tube sensor format so that the edge marker pulses may become coincident with the gate pulse edges. Whenever the separation between the selected target marker pulses exceeds one gate width, there is a recognized possibility of losing tracking control over the selected target.

FIG. 17 illustrates the various signals which occur within video processor section 19 and the synchronization circuit included as a matter of convenience within horizontal logic section 20. The signals of the first line within FIG. 17 detail typical positive transmission video signals produced by camera unit 11 during scanning of a general tracking problem. The first (a) and second-last (e) line portions of signal A in FIG. 17 show a representative background situation; the second (b) through fourth (d) line portions show the effect of a dark target T positioned against a comparatively light background. The last line portion (f) shows the presence of a vertical blanking pulse; horizontal blanking pulses occur in each of the other line portions at the trailing region. The horizontal and vertical synchronizing pulses produced by television camera unit 11 appear on the line designated C. Also superimposed on that line are the pulses $C_1$ and $C_2$ used to logically determine the existence of a vertical synchronization pulse in the composite synchronization signal. The last line of FIG. 17 shows the waveform H which occurs as the result of detecting a vertical synchronizing pulse in the composite synchronizing signal. Marker pulses detecting each contrast change occurring within a scan-line are designated D. By appropriate manual or automatic sensitivity control, the number and degree of contrast change detected within a typical scan-line may be varied. A variable amplification function carried out within video amplifier section 31 may be adequate for this purpose. The resulting rectified and squared edge marker pulses are appropriately designated +E and —E in the signal line designated E.

FIG. 18 illustrates the effect of the logic section output signal $X_p$ on the positioning of the horizontal tracking gate pulse within each video scan-line. The first and third line portions indicate situations wherein the gate pulse has been in effect moved significantly to the left or significantly to the right relative to the television picture tube raster centerlines. In the case of the first line portion (a) of FIG. 18, a large $+X_p$ signal will move marker pulse G leftward a proportional degree. The second line portion (b) of FIG. 18 shows the positioning of the gate pulse G at the horizontal center of the television picture tube raster by means of delay signal F produced by a zero feedback input voltage. The zero feedback voltage is used to reference operation of the tracker unit to the center of the television raster. FIG. 18(c) illustrates a situation wherein a high negative voltage horizontal tracking error correction signal is utilized to move the horizontal tracking gate G toward the extreme right portion of the television camera raster.

FIG. 19 illustrates the relations which exist as between vertical tracking signal L and its variably-positioned and sequentially-fired gate pulses J and K. It should be noted that the leading edge of gate pulse J is coincident with the trailing edge of variable duration positioning pulse H. Similarly, the leading edge of gate pulse K is coincident with the trailing edge of gate pulse J. Pulse signal L is the inverted composite of pulses J and K and is commonly referred to as the vertical gate pulse that is conducted to horizontal logic section 20 for use in gating edge marker pulses that are coincident therewith and with the basic horizontal tracking gate pulse. As previously commented, the trailing edge of pulse signal H is positioned time-wise from the start of each vertical scan in proportion to the magnitude of the $+Y_p$ or $-Y_p$ error correction signal that is the output of vertical logic section 21. In the arrangements shown in the drawings, if the $Y_p$ signal is of zero voltage value, the trailing edge of pulse H is normaly positioned just slightly above the center of the raster vertical centerline.

FIG. 20 illustrates typical coincidence relations that exist as between $-E$ and $+E$ target edge marker pulses and horizontal gate pulse G during automatic operation of the tracking system. As noted therein (FIG. 20(c), for instance), whenever a $+E$ pulse only is coincident with a horizontal tracking gate pulse G, the resulting passed pulse ($+M$) by triggering one-shot circuit 51 produces a $+N$ pulse of approximately one-line duration; no $-M$ or $-N$ pulses are developed in the same scan-line. Although not shown, in those instances in which a $-E$ pulse only is coincident with horizontal tracking gate pulse G (as during extreme rightward movement of the selected target relative to the sensor viewing axis), a $-N$ tracking error detection pulse is generated within any one video signal horizontal scan-line. Signal O is produced by OR gating the developed N tracking error detection pulses through OR gate circuit 63 in tandem. During proper tracking system sensor alignment with the selected target both $-N$ and $+N$ tracking error detection pulses will be provided within each video signal scan-line. However, such pulses in effect cancel each other in summing circuit 53 to indicate that no tracking horizontal correction is in fact required. In those tracking situations wherein alignment correction is required, a grouping of several consecutive $-N$ or $+N$ pulses will generally exist within an inidvidual field scan. Assuming that the duration of vertical gate pulses J and K are each approximately six (6) scan-lines and assuming that the target essentially extends vertically through the duration of the vertical tracking gates, the resulting grouping may consist of as many as twelve (12) consecutive tracking error detection pulses.

FIG. 21 shows generally similar tracking error detection pulse waveforms $+P$ and $-P$ developed within vertical logic section 21. It should be noted that each part of tracking error detection pulse signal O is essentially passed through either gate 58 or gate 59 if coincident with either a vertical tracking gate pulse K or J, respectively. During proper alignment of the tracking system sensor viewing axis with the selected target in the automatic mode of system operation, $-P$ and $+P$ pulses will occur in sequential groupings of individual pulses. Assuming that the time duration of the gates produced by one-shot circuits 55 and 56 are each approximately six (6) lines and assuming that the tracker unit is detecting one or both of the target edges so as to develop signal O in each scan-line, as many as twelve (12) successive P pulses in two different groupings may occur.

FIG. 22 shows the typical relations which exist as between $-N$ and inverted $+N$ pulses in the FIG. 9 arrangement and within an individual scan-line. In those instances where both target edge marker pulses are within the basic horizontal tracking gate the resulting tracking error detection signals are in effect cancelled by appropriate addition in summing circuit 53 and do not develop a tracking error correction signal $X_p$; however, when a single edge marker pulse is coincident with the basic horizontal tracking gate pulse, an unopposed N pulse is developed and serves to activate the subsequent circuits 53, 69, and 71 to produce a usable correction signal of proper polarity and magnitude. Filter circuit 69 essentially serves to smooth out the differences of the $-N$ and $+N$ signals in any one scan-line to desirable levels; through proper design for integrator circuit 71 and in certain tracker unit applications it is possible to eliminate the need for filter circuit 69.

FIG. 23 details the typical error correction signals $X_p$ that are developed from intermediate signals Q in response to tracking error detection pulses indicating a system requirement for re-alignment of the sensor viewing axis relative to the selected target. The time periods represented by the FIG. 23(a) and (b) combination and by the FIG. 23(c) and (d) combination are each essentially one vertical scan-time or a total of approximately 525 individual scan-lines in duration. It should be noted from FIG. 23 that a grouping of $-N$ pulses indicating that a relatively rightward-moving target leading edge is coincident with the basic horizontal tracking gate produces negative-going output signals Q and $X_p$ that drive the tracking gate rightwardly away from the coincident target edge and toward the target interior and opposite or trailing edge. Similarly, a grouping of inverted $+N$ pulses (FIG. 23(c)) indicating that a relatively leftward-moving target trailing edge is coincident with the basic horizontal tracking gate produces positive-going output signals Q and $X_p$ that drive the tracking gate leftwardly away from the coincident target edge and toward the target interior and opposite or leading edge. This principle of operation prevails in other embodiments of tracker unit 18 even though the basic horizontal tracking gate pulse be modified so that the gate fails entirely within or intermediate the target edges rather than the target edges normally being positioned entirely within the limits of the basic horizontal tracking gate.

In at least some known tracking system applications it is desirable and even necessary to improve overall performance by incorporating a tracker unit embodiment that minimizes the likelihood of losing vertical tracking lock-on during system automatic tracking operation and that minimizes the random drifting of the basic horizontal tracking gate when the gate is small in comparison to the horizontal separation of the tracked target's essentially vertical edges. These characteristics are generally particularly desirable in applications wherein the tracked target is comparatively large in size. An arrangement for accomplishing these objectives is shown in the schematic tracker unit embodiment of FIG. 24. In that illustration, the basic tracker unit features that are common to the FIG. 9 embodiment are shown in comparatively light lines. Those features which are incorporated by way of addition to the unit to obtain the improved operating characteristics are illustrated in comparatively heavy lines. Similarly, those construction features which may be deleted from the FIG. 9 arrangement as being undesirable or redundant are illustrated by cross-hatched lines. Also, it is to be noted at this point that the arrangement of FIG. 24 is best suited to use in tracking systems having a television camera sensor unit that produces a standard system video output signal. Normally $-E$ marker pulses are associated with decreasing video signal voltages including the leading edge of a selected comparatively dark target.

Video processor section 19 of the FIG. 24 embodiment differs in construction from the FIG. 9 arrangement essentially in the use of a switch 80 that may be selectively operated to cut out one output portion of edge pulse separator circuit 28 and to thereby activate one-shot circuit 81 and inverter circuit 82. Such additional components to section 19 are provided to generate a so-called "false trailing edge" marker pulse for each contrast change that is detected by video processor circuit 27. Since one-shot circuit 81 is to be triggered by each contrast change whether negative-going or positive-going to produce an artificial and delayed marker pulse at one-shot circuit 30, the separation function of edge pulse separator circuit 28 becomes totally unnecessary to satisfactory operation of the tracker unit. Accordingly, channel 37 is omitted from section 19 by operation of switch 80. In selecting the individual components for one-shot circuit 81, it is preferred that the circuit output signal have a time duration just a little longer than the duration of the basic horizontal tracking gate pulse developed by one-shot circuit 45. Thus, in one actual embodiment of the FIG. 24 tracker unit arrangement, one-shot circuit 81 was provided with a 1.5 microsecond width in relation to a 1.0 microsecond basic horizontal tracking gate pulse width. The output signals of the FIG. 24 version of video processing section 19 are, as in the case of the FIG. 9 arrangement, designated as —E and +E contrast marker pulses. The —E pulse, however, is normally generated with each negative-going voltage contrast change detected by video processor circuit 27 and therefore is basically associated with the leading edge of an essentially dark target positioned in a comparatively light background.

Horizontal logic section 20 in the FIG. 24 arrangement differs from the FIG. 9 construction primarily with respect to the development of a different horizontal gate pulse for use in vertical logic section 21, such gate pulse (U) being a time-extended version of the basic horizontal tracking gate pulse G. The components for accomplishing the difference in construction are essentially one-shot circuit 83, one-shot circuit 84, and the flip-flop circuit 85 comprised of cooperating inverter circuits 86 and 87. In normal inverter applications the two input terminals of each section to the typical dual inverter circuit module of FIG. 13 are joined together; in flip-flop current applications, however, the input terminals remain separate.

One-shot circuits 83 and 84 each provide an extension at one side of the basic horizontal tracking gate pulse G. The output pulse S of one-shot circuit 83, is of comparatively short duration and leads basic horizontal tracking gate pulse G; in inverted form the trailing edge of signal S triggers one-shot circuit 45. See FIG. 32. The basic horizontal tracking gate pulse G is inverted by circuit 46 and its trailing edge triggers one-shot circuit 84 to produce output pulse T. Pulse T is also of comparatively short duration and trails the trailing edge of pulse G. In one embodiment of the detailed tracker unit, and in the case of pulse S, pulse T provided an 0.5 microsecond extension to the adjacent edge of basic horizontal tracking gate pulse G. By means of flip-flop circuit 85, a positive-going extended horizontal gate pulse U is developed from S, G, and T signal pulse components for vertical logic section 21. The flip-flop circuit is utilized for the indicated purpose rather than an AND gate so as to eliminate any signal discontinuity which otherwise would or could appear in the composite extended horizontal gate pulse. An improved summing circuit 91 and filter circuit 92 are included in horizontal logic section 20 of FIG. 24 and are hereinafter described in detail.

Vertical logic section 21 of FIG. 24 differs from the corresponding portion of the FIG. 9 arrangement in several respects. The major difference resides in the fact that the real and false E contrast marker pulses developed in video processing section 19 are also coincidence gated by paired but independent vertical tracking gates 93 and 94. Such gating occurs with the extended horizontal tracking gate U and the separate vertical tracking gate portions J and K. OR gate 95 is included in the FIG. 24 section 21 to accomplish a function similar to previously-described OR gate 63.

Vertical logic section 21 of the FIG. 24 embodiment also differs from the FIG. 9 arrangement by including construction features which serve to stabilize the leading edge portions of the vertical tracking gate pulses J and K at the raster margin. Basically, the controllable monostable multivibrator circuit designated 54 triggers an intermediate one-shot circuit 96 having a duration of at least one scan-line. The output pulse of circuit 96 AND gates (at AND gate 97) each coincident pulse of synchronization signal C received from synchronizing signal amplifier 33. Thus, one-shot circuit 98 produces an initial vertical tracking gate pulse J that assuredly is started at the raster left margin in every instance. One-shot circuit 99, as in the case of circuit 56, develops a positive-going vertical gate pulse K in response to the triggering action of the trailing edge of inverted pulse J sourced in circuit 98. One-shot circuits 98 and 99 are generally similar to previously-described circuits 55 and 56 except that a controllable monostable multivibrator construction is employed. Such are triggered by pulses received from AND gate 97 or inverter circuit 60 are controlled by synchronization circuit 100 to assure that the produced gate pulse is stopped at a scan-line end. Component 101 of synchronization circuit 100 is a Zener-type diode. One-shot circuits 102 and 103 are provided in section 21 to give essentially one-line duration to the coincidence-passed real and false contrast marker pulses E gated through AND gates 93 and 94. An inverter circuit 104 is included in the channel leading from one-shot circuit 103 to develop the proper pulse polarity for summing circuit 105. Summing circuit 105 and filter circuit 106 are preferably of the improved construction associated with circuits 91 and 92.

FIG. 32 is provided in the drawing to show the relation of the components of expanded horizontal tracking gate pulse U to each other and the coincidence relation of such expanded gate pulse to the contrast marker pulses developed in section 19. As will be noted, the pre-selected degree of separation between the target leading edge pulse and the false trailing edge exceeds the width of the basic horizontal tracking gate pulse G. During tracking system alignment the straddling contrast marker pulses are non-coincident with the basic gate and accordingly do not derive tracking error detection pulses. However, whenever the selected target moves rightward or leftward with respect to the sensor viewing axis, one of such pulses becomes coincident with the tracking gate and develops a proper tracking error detection signal. The so-developed detection signal is then processed through one-shot circuit 50 or one-shot circuit 51 to summing circuit 91 and develops a correction signal that drives the basic horizontal tracking gate away from the coincident edge and interiorly of the target toward the opposite edge. It should be noted at this point with respect to the FIG. 9 tracker unit embodiment that that unit continues to track properly even though the target marker pulses actually are positioned to each side of the basic horizontal tracking gate pulse.

Summing circuit 91 of the FIG. 24 tracker unit embodiment is provided to obtain a significantly increased average output voltage for output signal Q. As disclosed by FIG. 23 of the drawings, the total duration of the stretched-out tracking error detection pulses which are the base for signal Q is an extremely small percentage of the time of one complete field (vertical) scan. In a tracker unit having vertical tracking gate pulses developed in each of one-shot circuits 55 and 56 of six lines duration, 12-volt amplitude error detection pulses have a maximum average output voltage in a full vertical field of approximately 0.275 volt. Summing circuit 91 as actually provided increased such average output voltage approximately twelve-fold to a value of 3.3 volts.

In the detailed construction of circuit 91 disclosed in FIG. 28, transistor components 110 and 111 are normally "on." Additional transistor components 112 and 113 are normally "off." Capacitor 114 is charged to approximately B+ volts by transistor component 110 and through silicon diode 115. When transistor component 110 is turned off by the negative-going inverted output of one-shot circuit 51, its collector voltage rises. This rise in turn is coupled to the emitter of transistor component 112. When the emitter of transistor 112 has become sufficiently positive, that component turns on and capacitor 114 begins to discharge through resistor 118 and such emitter. In this arrangement, the discharge current of capacitor 114 corresponds to the emitter current of transistor component 112; such current also essentially corresponds to the collector current of transistor 112. The current through resistor 116 is a constant current for transistor component 112 and consequently for the load filter capacitor 121 in the additionally detailed filter circuit 92. Capacitor 114 is made sufficiently large to insure that there is negligible voltage change on it during the time the output of one-shot circuit 51, as inverted by inverter circuit 65, is negative.

In a similar manner, a negative-going inverted output from one-shot circuit 50 will cause capacitor 117 to discharge through the emitter of transistor component 113 and through resistor 118 to provide an opposite current for the output. Thus, the output will be either positive or negtaive. Transistor components 112 and 113 are reverse-biased between pulses by the current through resistor 119 and through diodes 115 and 120. Between chargings of the circuit, capacitor 121 discharges through load impedance 122 only as the output of the circuit is a high impedance during this time.

In order to minimize the noise effects attributable to light level changes not of interest in the scene background portions of the video signal processed in a tracking system of the type illustrated in FIG. 3, it is sometimes desirable that the incorporated tracker unit 18 include suitable automatic gain control features for enhancing the selected target relative to its contrasting background. Use of target amplitude information along from the camera unit 11 video signal to develop automatic gain control is undesirable because any mechanization would require considerable direct-current gain and would be extremely difficult to stabilize so as to reduce temperature effects. Such deficiency is dictated by the reason that the target pulses processed through tracker unit 18 are limited in number (and frequency) and have narrow pulse widths. A satisfactory arrangement, however, has been discovered for accomplishing the desired automatic gain control for tractor unit 18 and is detailed in the disclosures of FIGS. 25 and 29.

In the schematic arrangement shown by the heavied lines of FIG. 25, circuit 130 may be included in a video processing section 10 to accomplish the desired automatic gain control. Such circuit in essence also accomplishes the contrast change detection function otherwise performed by video processor circuit 27. Circuit 130 receives the basic camera unit video signal A after it has been processed through filter circuit 120 to screen out video signal information which because of frequency is considered to be out of interest. The output detection signals of automatic gain control circuit 130 occur in connection with scanning of the selected target and serve as the inputs to one-shot circuits 29 and 81 for developing contrast marker pulses E for logic sections 20 and 21 as well as the source of signal amplitude level control. In the FIG. 25 arrangement it should be noted that the detection accomplished in circuit 130 is regulated in part by the coincidence input of extended horizontal tracking gate pulse U (established in section 20) and composite vertical tracking gate pulse L (developed in section 21). Details of a suitable construction for automatic gain control circuit 130 are provided in FIG. 29.

The basic approach in circuit 130 is to detect only amplified received target pulses that exceed a pre-set level in detector circuit 131 and that are therefore indicative of the to-be-tracked target; such detected pulses trigger marker pulse generation activity in circuits 29 and 81 and also trigger one-shot circuit 132 to generate automatic gain control. The output of circuit 132, which circuit is preferably a controllable monostable multivibrator circuit of the type used to construct circuits 44, 54, 98, etc., develops automatic gain control action at junction 133 sufficient to reduce the amplification of an increasing amplitude target in video amplifier 134 to below the threshold value established in detector circuit 131. When the control amplitude-decreasing action ceases, target pulse amplitudes are again sufficiently amplified by circuit 134 until the detector threshold value is again exceeded at which time one-shot circuit 132 is re-triggered and the entire action repeated.

Referring to FIG. 29, the basic target video signal information is furnished to input terminal 135. The automatic gain control effect is accomplished by varying the current which flows through silicon diode 136; the input voltage to amplifier circuit 134 is basically, therefore, controlled by the action of one-shot circuit 132. The trailing edge of the output pulse of one-shot circuit 132 is differentiated by the capacitor 137-resistor 138 network. The positive pulse appearing at the collector of transistor component 139 charges capacitor 140 and this in turn causes the current in transistor component 141 to increase. Such increase in effect decreases the dynamic impedance of silicon diode 136 to cause the output amplitude of the pulse conducted through silicon diode 142 to also decrease and thereby decrease the signal voltage appearing at the input to direct-current video amplifier 134. Such action continues until the reduced amplitude of the signal processed into detector circuit 131 falls below its pre-set or preselected threshold level at which time amplification of the video signal input to circuit 134 is restored to the desired level of target indication. A variable potentiometer means 144 may be included in the arrangement to provide a desired selectivity capability in controllable one-shot circuit 132. Those target pulses that are in effect gated through one of the detector branches of circuit 131 to edge marker (leading and false trailing edge) pulse-developing circuits 29 and 81 identify the presence of the selected target in the tracking system sensor field of view.

In those instances wherein it is desired that a higher tracking loop gain be provided in a tracking system of the type schematically disclosed in FIG. 3, it is preferred that the included tracker unit 18 embodiment for the system utilize tracking error detection signals of variable duration. More specifically, it has been discovered that improved system performance can be obtained if the developed tracking error detection signals each have a time duration that is proportional to the degree that the coincident target edge marker pulse (real or false) intrudes into the basic horizontal tracking gate pulse G from its adjacent edge. Such variable tracking error detection pulses do not have the "nearly one-line duration" of the N pulses otherwise developed by one-shot circuits 50 and 51. An arrangement for accomplishing such objective is disclosed schematically in FIG. 26 and in detail in FIG. 30.

In the FIG. 26 arrangement, the S horizontal tracking gate extension signal developed by one-shot circuit 83 is utilized to set tandem flip-flop circuits designated 160 and 161 in each signal scan-line just before each basic horizontal tracking gate pulse G. Such flip-flop circuits may each be constructed of the dual inverter module detailed in FIG. 13 and normally provide positive output signals to AND gate 162 and zero (or comparatively negative) output signals to AND gates 165 and 166 when set. However, when an error detection pulse M is gated through AND gate 48 or AND gate 49, the receiving flip-flop circuit is triggered to a reversed polarity output condition. (Signal S will serve to reset either triggered flip-flop circuit 160 or 161 to its basic output condition just before the next basic horizontal tracking gate pulse G.) AND gate 162 provides a continuous zero (comparatively negative) pulse output to inverter 163 until such time as received G and L basic horizontal and vertical tracking gate pulses and received pulses from both of the set flip-flop circuits are coincident. At such time the received pulses gate a positive pulse signal W to inverter 163; the inverted (negative) pulse output transmitted from circuit 163 to 164 then starts the proportioning function to be accomplished in linearizing circuit 164. A subsequent return of a flip-flop circuit zero (comparatively negative) signal to AND gate 162, as by the triggering of either of flip-flop circuits 160 and 161 by a gated M tracking error detection pulse, restores the zero output of AND gate 162, introduces a positive input to circuit 164, and initiates a termination action for the linearizing accomplishment of circuit 164. The triggered flip-flop circuit continues to produce a negative output until reset by pulse S. Linearizing circuit 164 functions to derive an output signal Z that is introduced directly into AND gate 165 and indirectly (after inversion by inverter circuit 167) into AND gate 166. Such output signal has a time duration that is related to and an indication of the linear intrusion of any coincident tracking error detection pulse M into gate pulse G; basically, the resistor and capacitor values for the components of circuit 164 are selected so that the output signal Z will have a duration of very near one scan-line period when the coincident marker or error detection pulse introduces into the basic horizontal tracking gate pulse G approximately the width of such gate pulse. The key waveforms of the FIG. 26 arrangement are shown in FIG. 33. Details of a preferred construction for circuit 164 are provided in FIG. 30. The input terminal to circuit 164 is designated 168 and the output terminal 169.

As above-mentioned, between successive time-coincident basic horizontal tracking gate pulses, the input signal to circuit 164 is positive and transistor component 170 is "on," thus drawing current through resistor 171. When the basic horizontal tracking gate pulse G and the basic vertical tracking gate pulse L along with the output pulse of a triggered flip-flop circuit appear at AND gate 162, transistor component 170 will be turned "off" by the resulting negative input to terminal 168 to thereby start the linearizing function in circuit 164. The current through resistor 171 now serves as a charging current for capacitors 172 and 173. The current through capacitor 172 serves as base current for transistor component 174; most of the current flowing from resistor 171, however, flows into capacitor 173 as collector current for transistor component 174. In this way capacitor 173 is charged by a constant current and the voltage of the collector of transistor 174 falls linearly until transistor component 170 is turned "on" again as by the termination of basic horizontal tracking gate pulse G and introduction of a positive signal to terminal 168. When such turning "on" action is accomplished, a negative signal is coupled to the base of transistor component 174 causing it to turn "off." If capacitor 173 has charged any, additional transistor component 175 will have turned "off." The collector voltage of transistor component 175 will then rise at a rate determined by the constant current source developed from resistors 176, 177, and 178 and transistor component 179. This constant current charges capacitor 173 through transistor component 170. When the collector of transistor 174 becomes sufficiently positive, transistor component 175 turns "on"; its output Z appears at terminal 169. The output at terminal 169 will be positive from the time capacitor 173 begins to charge until it has been discharged. Such time is a linear function of the distance from the leading edge of basic horizontal tracking gate pulse G to the leading edge of the time-coincident error detection pulse M.

AND gates 165 and 166 in the FIG. 26 arrangement function to gate comparatively positive Z pulses when such are time-coincident with a related output of a triggered flip-flop circuit 160 or 161; inverter circuits 64 and 65 are retained to place the gated information in proper negative form for the embodiment of integrator circuit 91 detailed in FIG. 28. Also, the inverted output of circuit 167 provides a positive pulse to AND gate 166 that is the complement of signal Z and that represents the measure of the distance of any coincident +M error detection pulse from the back edge of basic horizontal tracking gate pulse G. Thus, in this way the distance from either edge of basic gate pulse G to the tracking error detection pulse (target pulse) M is represented by the developed pulse width of signal Z.

In specific applications it may be desired to develop a tracking error correction signal in the vertical direction which in effect has the characteristics of the error correction signal developed by the horizontal logic section 20 disclosed schematically in FIG. 26. Such vertical tracking method can be accomplished using the schematic arrangement shown as vertical logic section 21 of FIG. 27 of the drawings; the disclosed construction develops a tracking error detection pulse signal that is proportional in time duration to the degree of intrusion of any coincident marker pulse into a basic vertical tracking gate pulse.

Basically, the time-porportioned output is developed in vertical logic section 21 using vertical false edge single tracking gate circuit 200 of the drawings. The basic inputs to such circuit are shown by the heavied lines of FIG. 27 and include vertical tracking gate pulse J generated by one-shot circuit 98, a false horizontal trailing edge pulse separation signal AA from the output of one-shot circuit 81, and the basic horizontal tracking gate pulse G developed by one-shot circuit 45. The output signals of circuit 200 are the inputs to a summing circuit 105 preferably having the construction detailed in FIG. 28.

The separation signal output of horizontal false trailing edge one-shot circuit 81 is sampled by horizontal tracking gate pulse G in AND gate circuit 201 (FIG. 31) during each television video signal line of horizontal scan. If a false target edge is detected by the coincidence-gating operation, one-shot circuit 202 is triggered to provide an appropriate indication. The end of the basic horizontal tracking gate pulse G, as detected and given in pulse BB form by differentiator circuit 203, is conducted to AND gates 204 and 205 to sample the output state of one-shot circuit 202; the results of such sampling are stored in the flip-flop circuit made up of the individual inverter circuits designated 206 and 207. When a detected horizontal false trailing edge pulse appears on a scan-line following a line in which no target detection pulse was present, the output of inverter 207 will make a positive change thereby triggering one-shot circuit 208. One-shot circuit 208 produces a pulse CC that has a predetermined time duration (e.g., eight scan-line periods), that is controlled by the output of synchronizing circuit 209 to assure turn-off of circuit 208 at the same relative position in a scan-line that it started, and that serves to establish a false target bottom edge. The vertical single tracking gate pulse J produced by circuit 98 is controlled to commence at the beginning of a scan-line by one-shot circuit 96 and triggers one-shot circuit 210 having a time duration of one scan-line. The output of circuit 210 along with sampling pulse BB, if time-coincident in AND gate 211, set the flip-flop circuit comprised of individual inverter circuits 212 and 213. The flip-flop circuit comprised of inverters 212 can be set only once in each video signal frame and at the start of each vertical gate for the reason that if one-shot circuit 208 has been triggered its output will be conducted to OR gate 214 to prevent inverter 212 rom turning "off" and will thereby prevent the re-setting of such flip-flop circuit until dictated by an output from AND gate 211. If one-shot circuit 208 has not been triggered, then the output of inverter circuit 212 will make a positive change setting the incorporating flip-flop circuit and producing an output that is proportional, in time, to the number of lines following the start of the single vertical tracking gate pulse J that one-shot circuit 208 is triggered. If one-shot circuit 208 is never triggered, then the output of inverter module 215 as conducted through OR gate 214 will reset the flip-flop circuit (components 212 and 213) at the end of the basic single vertical tracking gate pulse. The positive output pulse DD from the flip-flop circuit inverter portion 212 is the input to one terminal of summing circuit 105 and has a duration that measures the intrusion of the target top edge into the basic single vertical tracking gate pulse.

If one-shot circuit 208 is triggered far enough in advance of the end of the single vertical track gate pulse, a pulse generated by its reset will be gated through AND gate 217 and will trigger the flip-flop circuit made up of inverter components 218 and 219. This particular combination of inverter components will be reset by the coincidence of sampling pulse BB with the output of one-shot circuit 220 in AND gate 221 at the last line of the vertical gate. Inverter circuit 219 is provided to develop the enabling signal for the re-setting action. The output vertical tracking error detection signal EE of inverter 219 is a positive signal which is proportional in time to how many lines before the end of the basic single vertical tracking gate pulse J the target false bottom pulse established by the end of pulse CC occurs. An indication of the target having been lost is available from circuit 200 as the output of inverter 212 will be positive during the total single vertical tracking gate pulse to give a continual maximum drive down signal.

I claim:

1. A tracking system tracker unit which generates an electrical azimuth tracking error correction signal in response to detected changes in a televiseion camera output video signal picturing a selected target in a contrasting background to control the viewing axis of the television camera in azimuth tracking relation to the selected target, comprising:
   (a) Detector circuit means detecting voltage amplitude changes in the television camera output video signal and producing detection pulses that identify and mark positive-going and negative-going voltage changes that indicate the real time-position of edge-like characteristics of the selected target,
   (b) Separator circuit means functioning to classify contrast detection pulses received from said detector circuit means into separate positive-going and negative-going voltage change channels,
   (c) Pulse generator circuit means generating a horizontal tracking gate pulse having a definite time duration and having a variable time-position in each line of horizontal scan of the television camera,
   (d) Two AND gate circuit means each receiving one different class of contrast detection pulses separately channelled by said separator circuit means and horizontal tracking gate pulses generated by said pulse generator pulse means and gating time-coincident portions of those pulses received therein as azimuth tracking error detection pulses,
   (e) Summing circuit means functioning to add the tracking error detection pulses gated by said two AND gate circuit means and produce a tracking error detection pulse signal representing the difference thereof and representing a selection of a desired direction of azimuth tracking error correction, and
   (f) Integrator circuit means integrating the signal produced by said summing circuit means to form said electrical azimuth tracking error correction signal, said azimuth tracking error correction signal positioning the horizontal tracking gate pulse generated by said pulse generator circuit means in a non-singularly coincident relation to received contrast detection pulses at each of said two AND gate circuit means and controlling movement of the viewing axis of the television camera to an aligned azimuth tracking relation to the selected target.

2. The tracking system tracker unit defined by claim 1, wherein an electrical elevation tracking error correction signal is additionally generated to control the viewing axis of the television camera in elevation tracking relation to the selected target, said tracker unit additionally comprising:
   (g) additional pulse generator circuit means generating a vertical tracking gate pulse having a definite time duration and having a variable time-position in a vertical direction of scan,
   (h) two additional AND gate circuit means each receiving a different time portion of the vertical tracking gate pulse generated by said additional pulse generator circuit means and pulses indicating the real time existence of said contrast detection pulses produced by said detector circuit means and grating those pulses which are time-coincident in any one of said two additional AND gate circuit means as elevation error detection pulses.
   (i) additional summing circuit means functioning to add the tracking error detection pulses gated by said additional two AND gate circuit means and produce a tracking error detection pulse signal representing the difference thereof and representing a selection of a desired direction of elevation tracking error correction, and
   (j) additional integrator circuit means integrating the signal produced by said additional summing circuit means to form said electrical elevation tracking error correction signal,
said elevation tracking error correction signal positioning the vertical tracking gate pulse generated by said additional pulse generator circuit means in a non-singularly coincident relation to said pulses indicating the real-time existence of contrast detection pulses produced by said detector means received at each of said additional two AND gate circuit means and controlling movement of the viewing axis of the television camera to an aligned elevation tracking relation to the selected target.

3. The tracking system tracker unit defined by claim 2, wherein said pulses indicating the real-time existence of contrast detection pulses produced by said detector circuit means and being received at said additional two AND gate circuit means are essentially said azimuth tracking error detection pulses gated by said first two AND gate circuit means, said pulses indicating the real-time existence of contrast detection pulses produced by said detector circuit means being OR gated by OR gate circuit means located intermediate said first two AND gate circuit means and said additional two AND gate circuit means.

4. In a tracking system tracker unit which generates an electrical azimuth tracking error correction signal in response to detected voltage amplitude changes that exist in a television camera output video signal and that identify a selected target to control the viewing axis of the television camera in azimuth tracking relation to the selected target in combination:
   (a) means generating marker pulses which are identified with detected voltage amplitude changes in the television camera video signal and which establish the time-position of relatively leftward and rightward contrast change characteristics of the selected target in successive horizontal lines of scan,
   (b) means generating a horizontal tracking gate pulse having a definite duration and having a time-position in each of said horizontal lines of scan that may be varied relatively leftward and rightward from a tracking alignment position, (c) first gate means receiving marker pulses generated by said first means as identifying relatively leftward contrast change characteristics of the selected target and horizontal tracking gate pulses generated by said second means and gating those received marker pulses which are time-coincident therewith as relatively rightward azimuth tracking error detection pulses, (d) first gate means receiving marker pulses generated by said first means as identifying relatively rightward contrast change characteristics of the selected target and horizontal tracking gate pulses generated by said second means and gating those received marker pulses which are time-coincident therewith as relatively leftward azimuth tracking error detection pulses, and (e) means converting said marker pulses gated by said first and second gate means as relatively rightward and leftward azimuth tracking error detection pulses into a correlated azimuth tracking error correction signal, said last means producing an azimuth tracking error correction signal that drives the time-position of the horizontal tracking gate pulse generated by said second means in each horizontal line of scan leftward in response to relatively rightward azimuth tracking error detection pulses and rightward in response to relatively leftward azimuth tracking error detection pulses, and said azimuth tracking error correction signal also serving to control drive of the viewing axis of the tracking system television camera to an aligned tracking relation to the selected target.

5. The tracking system tracker unit defined by claim 4, wherein said horizontal tracking gate pulse has a time duration which is less than the scan duration separating the relatively leftward and rightward contrast change characteristic of the selected target, said marker pulses generated by said first means being non-coincident with said horizontal tracking gate pulse in each horizontal line of scan when the tracking system television camera viewing axis is positioned with respect to the selected target in initial and in aligned tracking relation.

6. The tracking system tracker unit defined by claim 4, wherein said horizontal tracking gate pulse has a time duration which is greater than the scan duration separating the relatively leftward and rightward contrast change characteristics of the selected target, said marker pulses generated by said first means each being coincident with said horizontal tracking gate pulse in each horizontal line of scan when the tracking system television camera viewing axis is positioned with respect to the selected target in initial and in aligned tracking relation.

7. The tracking system tracker unit defined by claim 4, wherein said azimuth tracking error correction signal controls a controllable monostable multivibrator circuit means that drives the time-position of said horizontal tracking gate pulse in each horizontal line of scan either relatively rightward or relatively leftward, said circuit means also being manually controllable to position the tracking system in initial tracking relation to the selected target.

8. In a tracking system tracker unit which generates relatively positive to relatively negative tracking error correction signals in response to detected voltage amplitude changes that exist in a television camera output signal and that identify a relatively displaced selected target to return the viewing axis of the television camera to an aligned tracking relation to the selected target, in combination:

(a) Means generating marker pulses which are identified with detected voltage amplitude changes in the television camera output video signal and which establish the time-position of opposed contrast change characteristics of the selected target at relatively positive and relatively negative positions in a line of scan of given orientation, (b) Means generating a tracking gate pulse having a definite duration and having a variable time-position in the line of the direction of scan throughout the range of relatively positive and relatively negative positions, (c) Paired gate means, one of which gate means receives marker pulses generated by said first means and associated with a relatively positive position and tracking gate pulses generated by said second means and the other of which gate means receives marker pulses generated by said first means and associated with a relatively negative position and tracking gate pulses generated by said second means, gating only those received marker pulses which are time-coincident with a received tracking gate pulse as a tracking error detection pulse, and (d) Means converting gated relatively positive position marker pulses into a tracking error correction signal that positions the tracking gate pulse generated by said second means toward a relatively negative position and converting gated relatively negative position marker pulses into a tracking error detection pulse into a tracking error correction signal that positions the tracking gate pulse generated by said second means toward a relatively positive position.

9. In a tracking system tracker unit which generates an electrical azimuth tracking error correction signal in response to detected voltage amplitude changes that exist in a television camera output video signal and that identify a selected target to control the viewing axis of the television camera in azimuth tracking relation to the selected target, in combination:

(a) First means generating marker pulses which are identified with detected voltage amplitude changes in the television camera video signal and which establish the time-position of an associated leading edge and an associated trailing edge of the selected target in successive horizontal lines of scan, (b) Second means generating a horizontal tracking gate pulse having a definite duration and having a variable time-position in each of said horizontal lines of scan, (c) Third means receiving marker pulses generated by said first means and horizontal tracking gate pulses generated by said second means and gating only those of said marker pulses which are received in time-coincident relation with received horizontal tracking gate pulses as azimuth tracking error detection pulses, and (d) Fourth means converting the marker pulses gated by said third means as azimuth tracking error detection pulses into a correlated azimuth tracking error correction signal, said fourth means producing a tracking error correction signal that drives the time-position in each of said horizontal lines of scan of the horizontal tracking gate pulse generated by said second means in a direction away from any singularly coincident marker pulse associated with one of said edges of the selected target and interiorly of the selected target toward the other of said edges, and that drives the viewing axis of the tracking system television camera in a like direction.

10. The tracking system tracker unit defined by claim 9, wherein said horizontal tracking gate pulse has a time duration which is less than the scan duration separating the leading and trailing edges of the selected target, said marker pulses generated by said first means and associated with the leading and trailing edges of the selected target each being non-coincident with said horizontal tracking gate pulse in each horizontal line of scan when the tracking system television camera viewing axis is positioned with respect to the selected target in initial and in aligned tracking relation.

11. The tracking system tracker unit defined in claim 9, wherein said horizontal tracking gate pulse has a time duration which is greater than the scan duration separating the leading and trailing edges of the selected target, said marker pulses generated by said first means and associated with the leading and trailing edges of the selected target each being coincident with said horizontal tracking gate pulse in each horizontal line of scan when the tracking system television camera viewing axis is positioned with respect to the selected target in initial and in aligned tracking relation.

12. The tracking system tracker unit defined by claim 9, wherein an electrical elevation tracking error correction signal is generated to additionally control the viewing axis of the television camera in elevation tracking relation to the selected target, said tracker unit having means generating elevation tracking error detection pulses from pulses which are gated by said third means and which are time-coincident with a vertical tracking gate pulse.

13. In a tracking system tracker unit which generates an electrical tracking error correction signal in response to detected voltage amplitude changes that exist in a television camera output video signal and that identify a selected target to control the viewing axis of the television camera in tracking relation to the selected target, in combination:
(a) Means generating marker pulses which are identified with the detected voltage amplitude changes in the television camera output video signal and which establish the time-position of associated opposed contrast change characteristics of the selected target in a line of scan of given orientation,
(b) Means generating a tracking gate pulse having a definite duration and having a variable time-position in said line of scan,
(c) Means receiving marker pulses generated by said first means and tracking gate pulses generated by said second means and gating only those of said marker pulses which are received in time-coincident relation with received tracking gate pulses as tracking error detection pulses, and
(d) Means converting the marker pulses gated by said third means as tracking error detection pulses into a tracking error correction signal,
said last means producing a tracking error correction signal that drives the time-position in said line of scan of the tracking gate pulse generated by said second means in a direction away from any marker pulse associated with one contrast change characteristic of the selected target and singularly coincident with one of said tracking gate pulses and toward the non-coincident marker pulse associated with the opposed contrast change characteristic of the selected target, and that drives the viewing axis of the tracking system television camera in a like direction.

14. In a method of processing a television camera video signal to develop a tracking error correction signal that controls the viewing axis of the television camera in aligned tracking relation with a selected target, the steps of:
(a) Detecting a positive-going voltage amplitude change and a negative-going voltage amplitude change in the television camera video signal indicating the real-time presence of opposed edge-like characteristics in the selected target,
(b) Separating said positive-going voltage amplitude change into one chanel and forming an edge marker pulse therefrom,
(c) Separating said negative-going voltage amplitude change into a separate channel and forming an edge marker pulse therefrom,
(d) Forming a tracking gate pulse having a definite time duration and a variable time-position in the direction of scan and introducing said tracking gate pulse into each of said channels,
(e) Gating said edge marker pulse in said one channel when time-coincident with said tracking gate pulse as a first tracking error detection pulse,
(f) Gating said edge marker pulse in said separate channel when time-coincident with said tracking gate pulse as a second tracking error detection pulse,
(g) Expanding the duration of each of said tracking error detection pulses when gated into a tracking error detection signal having a form which can be added to obtain a difference of the tracking error detection pulse output of said channels, and
(h) Adding said tracking error detection signals and forming their difference into said tracking error correction signal.

15. The method defined in claim 14, wherein the tracking error correction signal formed by the addition difference of said tracking error detection signals controls the variable time-position of said tracking gate pulse, said tracking error correction signal moving the time-position of said tracking gate pulse away from any edge marker pulse singularly coincident in one of said channels with said tracking gate pulse in a direction interiorly of the selected target and toward the time-position of the edge-like characteristic marker pulse separated into the other of said channels.

16. The method defined by claim 14, wherein said tracking gate pulse is formed with a time duration which is less than the time duration separating said edge marker pulses separated into said channels, said tracking gate pulse being positioned time-wise entirely intermediate said edge marker pulses during tracking alignment of the television camera viewing axis with the selected target.

17. The method defined by claim 14, wherein said tracking gate pulse is formed with a time duration which is greater than the time duration separating said edge marker pulses separated into said channels, said tracking gate pulse being positioned time-wise in coincident relation to each of said edge marker pulses in said channels during tracking alignment of the television camera viewing axis with the selected target.

18. In a method of processing a television camera video signal to develop a tracking error correction signal that controls the viewing axis of the television camera in aligned tracking relation with a selected target, the steps of:
(a) Forming separate edge marker pulses which are each identifiable with an opposed edge-like characteristic in the selected target,
(b) Forming a tracking gate pulse having a definite time duration and a variable time-position in a direction of scan,
(c) Gating those of said edge marker pulses which are identified with a relatively leading edge of the selected target in the direction of scan and which are time-coincident with said tracking gate pulse as a first tracking error detection signal,
(d) Gating those of said edge marker pulses which are identified with a relatively trailing edge of the selected target in the direction of scan and which are time-coincident with said tracking gate pulse as a second tracking error detection signal,
(e) Adding said separately-gated tracking error detection signals and utilizing an analog of their difference as a tracking error correction signal to control the viewing axis of the television camera in aligned tracking relation with the selected target, and
(f) Additionally utilizing said analog tracking error correction signal to position said tracking gate pulse away from that gated edge marker pulse which essentially sources said tracking error correction signal in a direction interiorly of the target and toward the separate edge marker pulse identified with an opposite edge-like characteristic of the selected target.

References Cited
UNITED STATES PATENTS

| | | | |
|---|---|---|---|
| 2,403,975 | 7/1949 | Graham | 250—203 |
| 2,792,190 | 5/1957 | Seibold | 244—14 |
| 2,806,205 | 9/1957 | Donath | 324—68 |
| 2,970,187 | 1/1961 | Hinton | 178—6.8 |
| 3,010,024 | 11/1961 | Barnett | 250—203 |
| 3,039,002 | 6/1962 | Guerth | 250—203 |
| 3,142,057 | 7/1964 | Deri | 343—7 |

RODNEY D. BENNETT, Primary Examiner

D. C. KAUFMAN, Assistant Examiner

U.S. Cl. X.R.

250—203